(12) United States Patent
Armstrong et al.

(10) Patent No.: US 9,386,884 B2
(45) Date of Patent: Jul. 12, 2016

(54) FOOD PROCESSOR

(75) Inventors: Daniel Armstrong, Kaleen (AU);
Lochana Subasekara Widanagamage Don, Caringbah (AU); Keith James Hensel, Lane Cove (AU); Shelley Anne Hensel, legal representative, Lane Cover (AU)

(73) Assignee: Breville Pty Limited, Alexandria, NSW (AU)

( * ) Notice: Subject to any disclaimer, the term of this patent is extended or adjusted under 35 U.S.C. 154(b) by 238 days.

(21) Appl. No.: 13/992,232

(22) PCT Filed: Dec. 7, 2011

(86) PCT No.: PCT/AU2011/001578
§ 371 (c)(1),
(2), (4) Date: Sep. 4, 2013

(87) PCT Pub. No.: WO2012/075525
PCT Pub. Date: Jun. 14, 2012

(65) Prior Publication Data
US 2014/0021278 A1    Jan. 23, 2014

(30) Foreign Application Priority Data

Dec. 7, 2010  (AU) ............................. 2010905367
Apr. 27, 2011 (AU) ............................. 2011901537

(51) Int. Cl.
*A47J 43/07*  (2006.01)
*A47J 36/06*  (2006.01)

(52) U.S. Cl.
CPC ............ *A47J 43/0794* (2013.01); *A47J 36/06* (2013.01); *A47J 43/0772* (2013.01); *A47J 43/0788* (2013.01)

(58) Field of Classification Search
CPC . A47J 43/0772; A47J 43/0777; A47J 43/046; A47J 43/06; A47J 43/075; A47J 43/0761; A47J 43/0727; A47J 43/0716; A47J 43/0722; A47J 43/085; A47J 36/06; A47J 36/10; A47J 43/04; A47J 43/0711; A47J 31/58; A47J 43/0794; A47J 43/082; A23N 1/02
USPC .......... 99/510, 511, 513; 241/37.5, 92, 282.1, 241/282.2
See application file for complete search history.

(56) References Cited

U.S. PATENT DOCUMENTS

| | | | | |
|---|---|---|---|---|
| 4,542,857 A * | 9/1985 | Akasaka | | 241/37.5 |
| 4,700,903 A * | 10/1987 | Henn | | 241/101.2 |
| 5,395,060 A * | 3/1995 | Hackel et al. | | 241/92 |
| 6,000,650 A * | 12/1999 | Penaranda | | A47J 43/082 241/282.1 |
| 6,397,735 B1 * | 6/2002 | Wong | | 99/492 |
| 7,028,930 B2 * | 4/2006 | Carnevale | | 241/37.5 |
| 7,387,269 B2 * | 6/2008 | Mally | | A47J 43/085 241/282.1 |
| 7,430,957 B2 * | 10/2008 | Sands | | A47J 19/027 366/205 |
| 8,042,990 B2 * | 10/2011 | Pryor, Jr. | | A47J 43/0766 366/197 |
| 8,181,567 B2 * | 5/2012 | Bourgeois-Potage | | A47J 19/027 210/360.1 |
| 8,550,390 B2 * | 10/2013 | Machovina | | A47J 43/046 241/261.1 |
| 9,084,512 B2 * | 7/2015 | Boozer | | A47J 43/0716 |

* cited by examiner

*Primary Examiner* — Faye Francis
(74) *Attorney, Agent, or Firm* — Molins & Co. Pty. Ltd.

(57) ABSTRACT

A food processor is provided with a wide feed tube. The food processor has a pusher that cooperates with a safety mechanism. The safety mechanism comprises a linkage assembly that prevents the food processor's motor from operating unless the pusher is inserted into the feed tube.

26 Claims, 40 Drawing Sheets

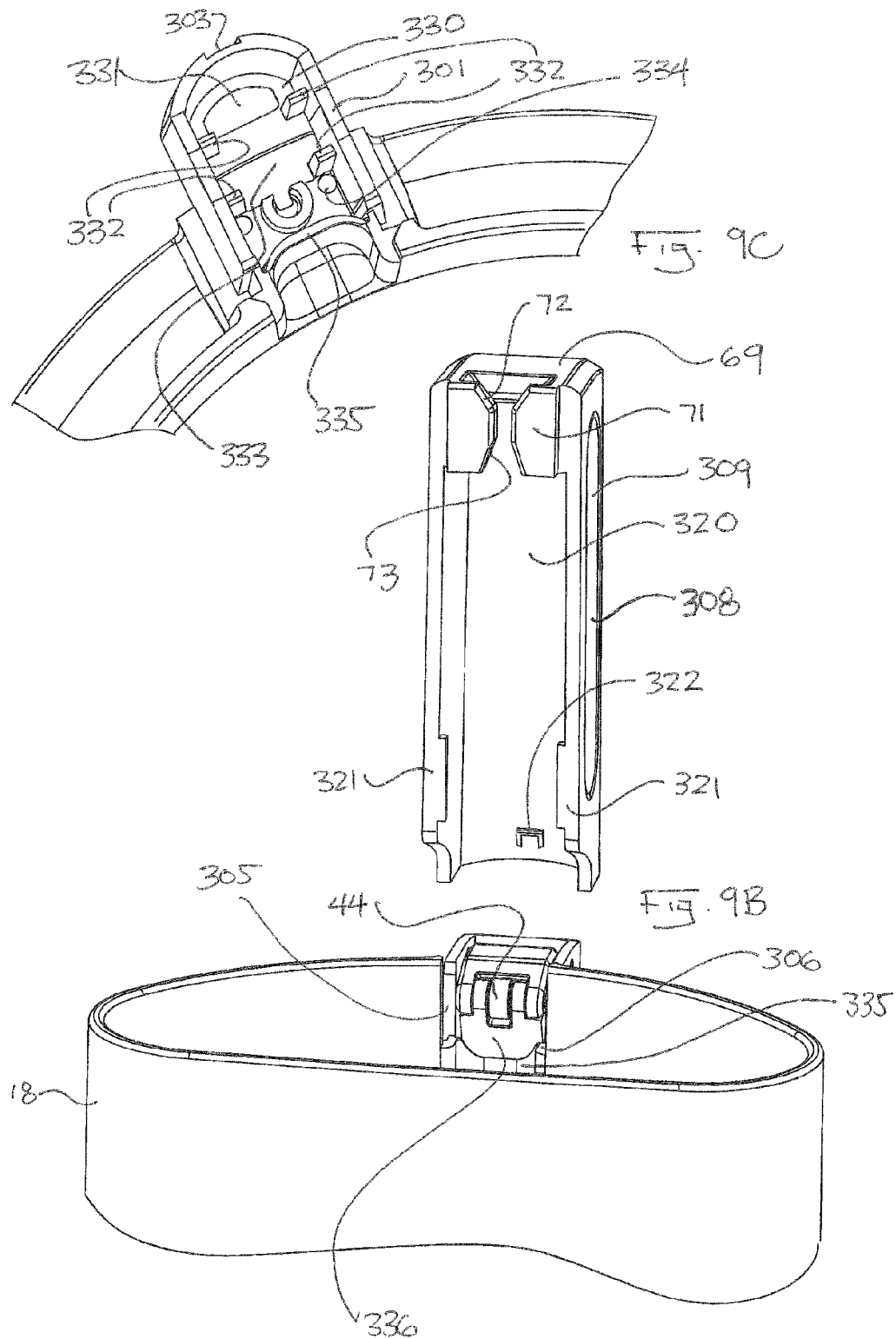

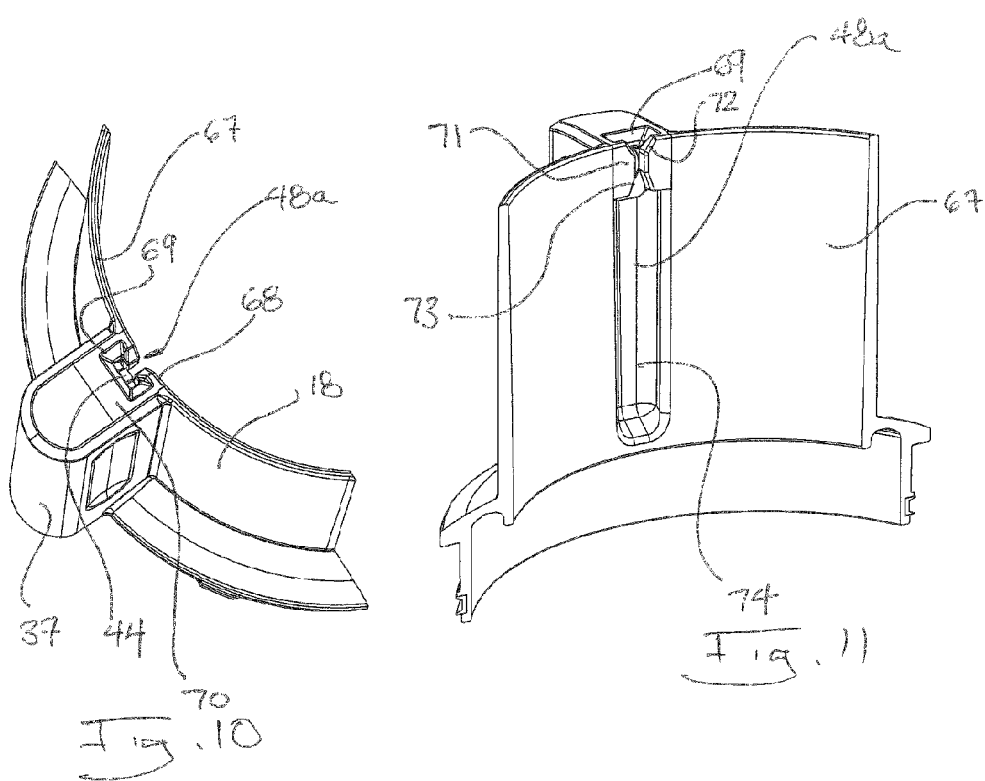

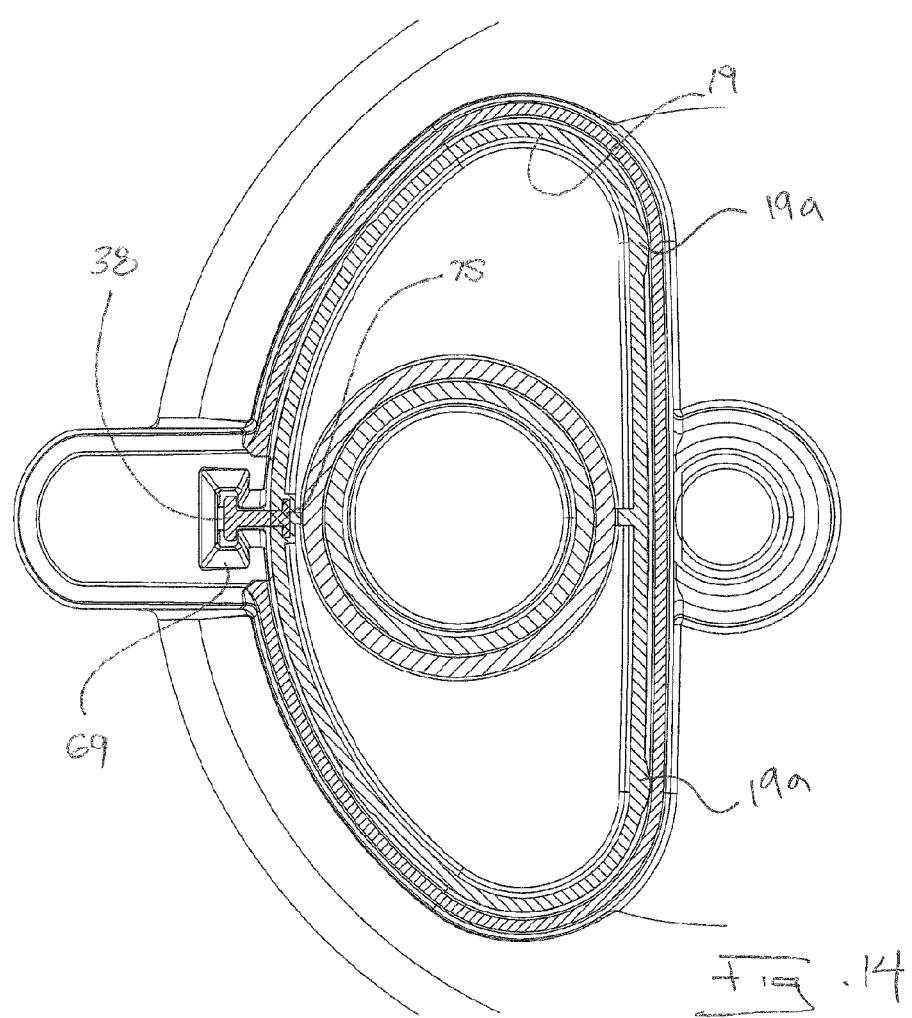

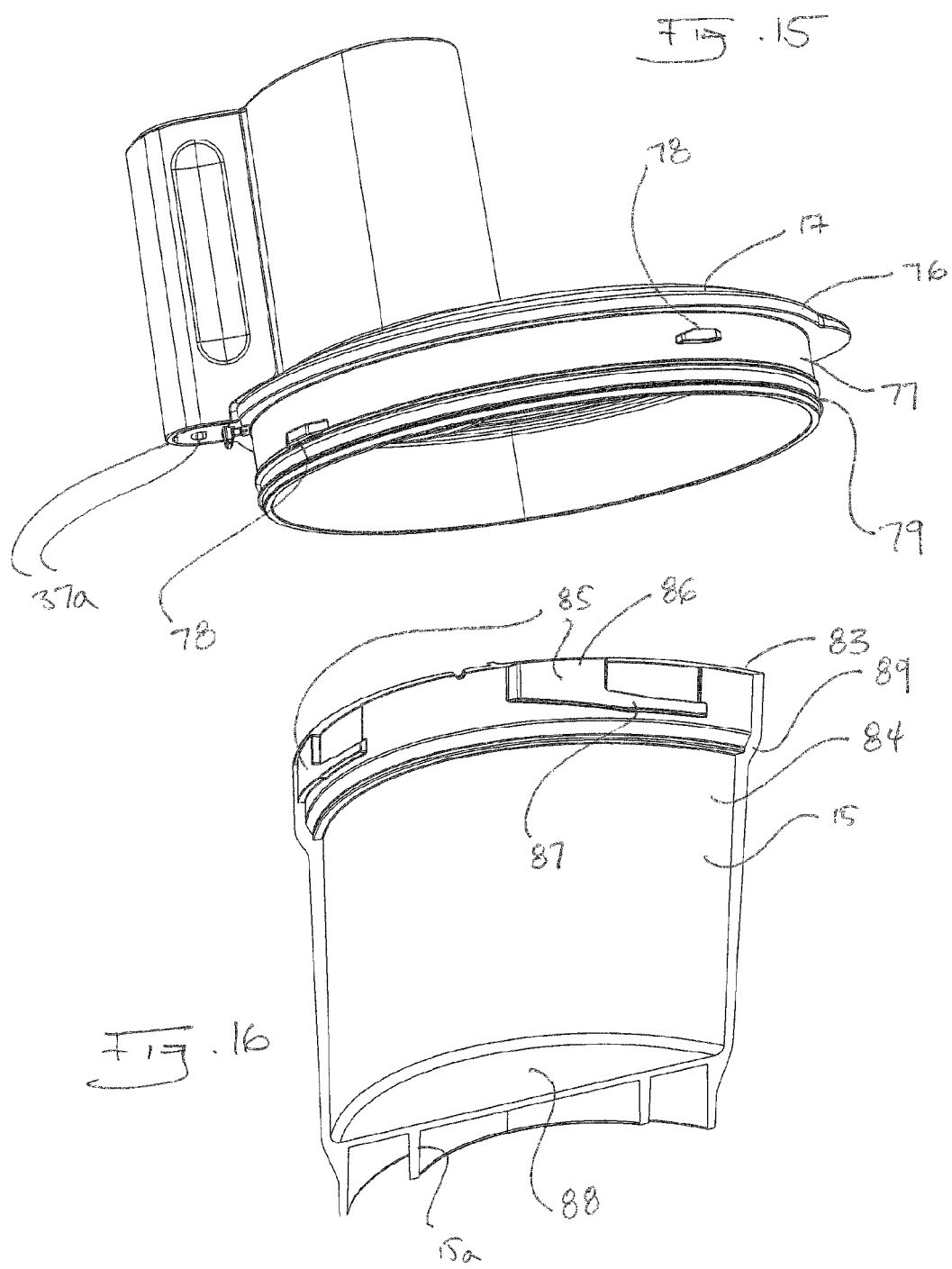

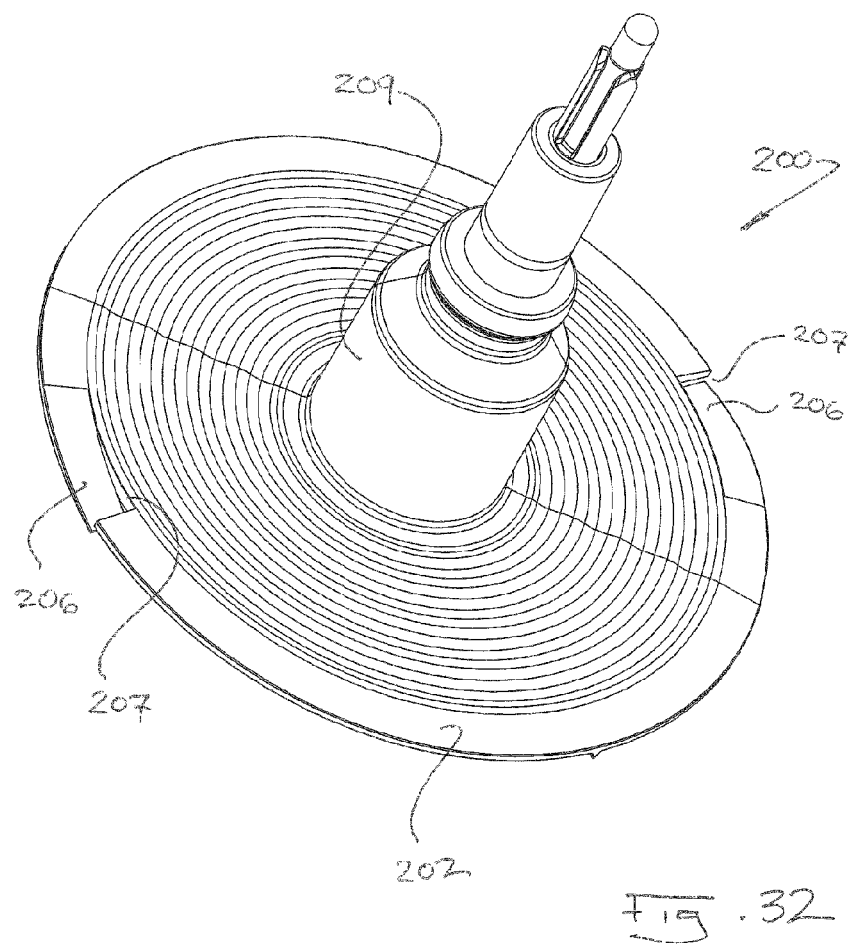

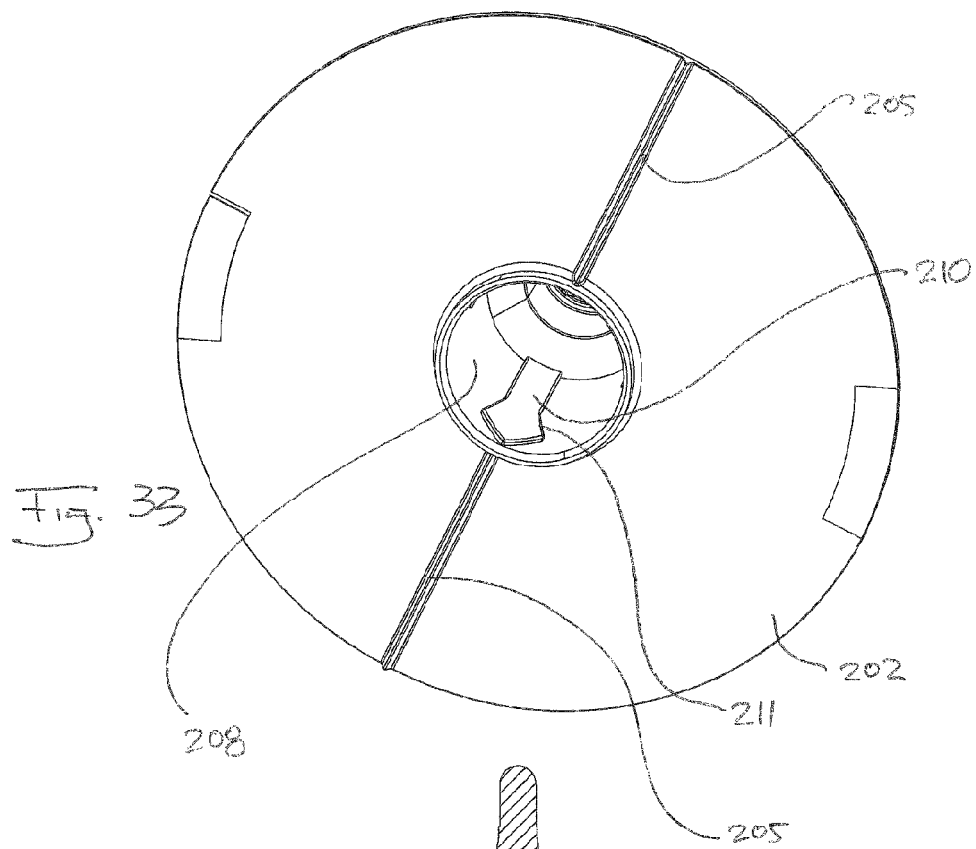
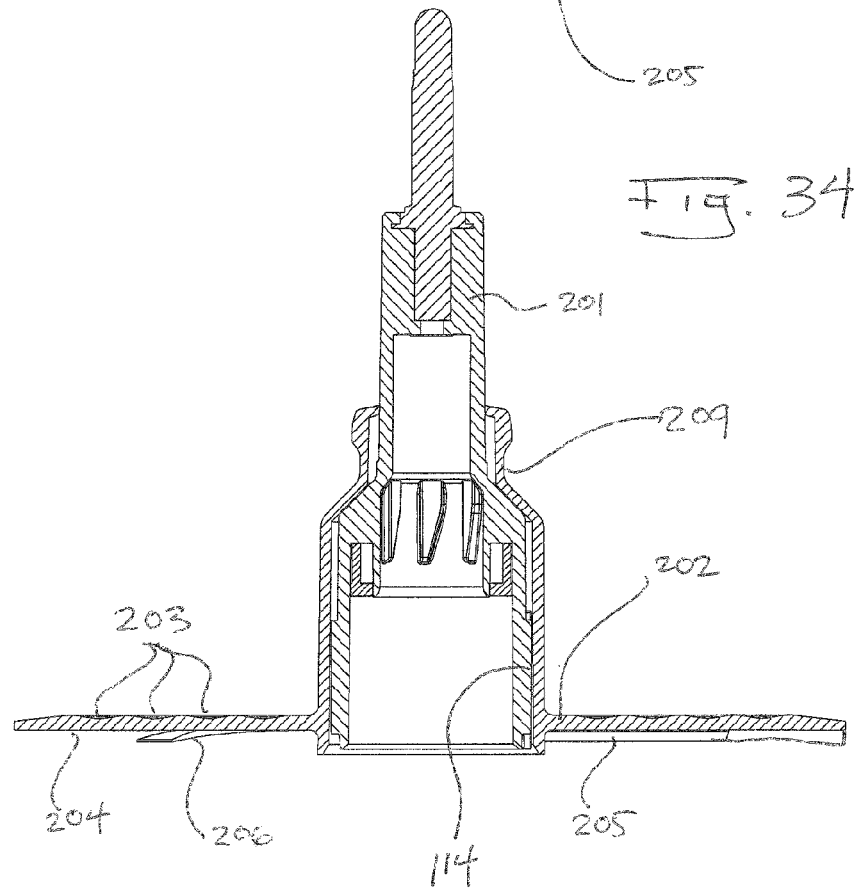

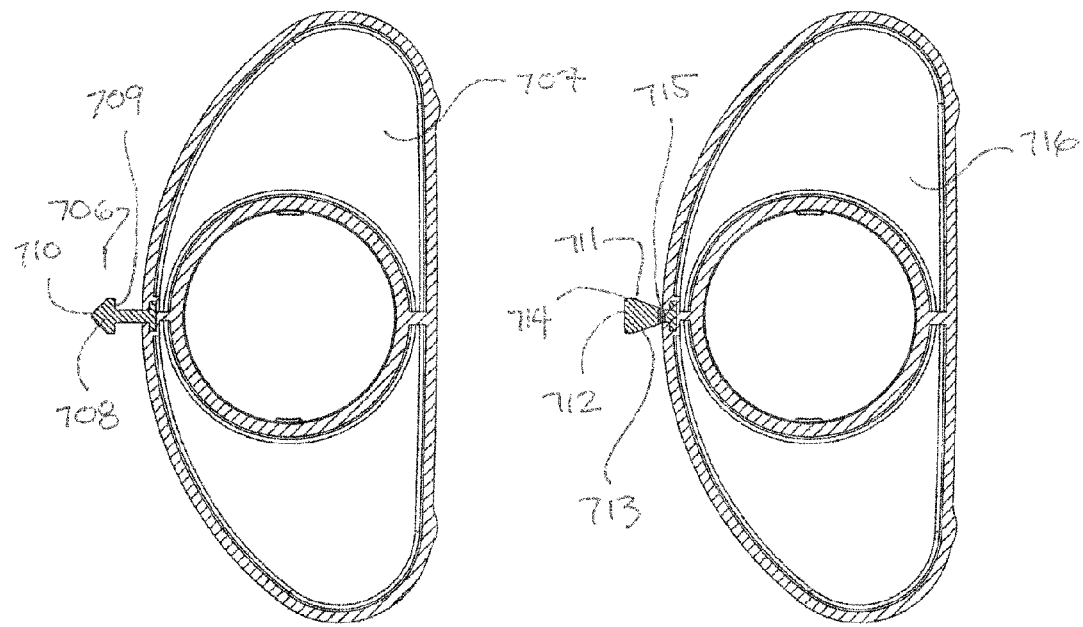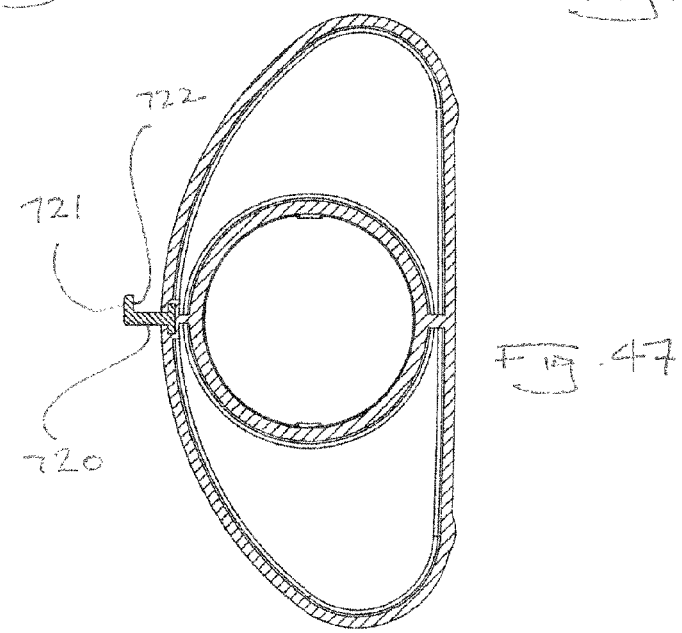

FOOD PROCESSOR

FIELD OF THE INVENTION

The invention relates to motorised kitchen appliances and more particularly to a food processor.

The invention has been developed primarily for use as a food processor and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Food processors are well known. Trends in domestic food processors indicate a desire, by consumers, for a food processor with a wider feed tube. A wider feed tube means that more ingredients and larger ingredients can be introduced into the device, thereby shortening food preparation time and adding convenience. However, food processors with sufficiently large feed tubes are expected to have and sometimes required to have safety interlock devices that prevent or at least minimise injury caused by accident or even intentional acts. In food processors with such safety devices, the internal blades of the food processor will not rotate unless the pusher is first inserted into the feed tube.

In addition to safety features, consumers also expect performance and convenience features.

Food processors with larger feed tubes require larger blades, accessories and motors. These features tend to introduce unwanted vibration and extra stresses on the components.

OBJECTS OF THE INVENTION

It is an object of the present invention to overcome or ameliorate at least one of the disadvantages of the prior art, or to provide a useful alternative.

It is an object of the invention in a preferred form to provide a food processor with a safety interlock that provides a meaningful alternative to those devices found in the prior art.

It is also an object of the invention in a preferred form to provide a food processor with other useability and safety features.

SUMMARY OF THE INVENTION

According to an aspect of the invention there is provided a pusher device for a food processor, the pusher having a body and a cap, the improvement comprising:
  a safety rail that extends above a surface of the body;
  wherein the a safety rail cooperates with a longitudinal slot in a lid of the food processor.

Preferably, the safety rail is a "T" shaped section; the "T" shaped section comprising a flat capping that is supported above the body by a web that is rigidly attached to the body at one or more locations along the length of the web. Alternatively, the safety rail is a "L" shaped section; the "L" shaped section comprising a flat flange that is supported above the body by a web that is rigidly attached to the body at one or more locations along the length of the web.

Preferably, the safety rail is insert moulded with the body and formed from a harder wearing material than the body. More preferably, the harder wearing material comprises a compound or polymer.

Preferably, when the pusher is located within a feed tube, the safety rail cooperates with the longitudinal slot for restricting movement of the pusher toward a side of the feed tube opposite the longitudinal slot.

Preferably, the web is attached to the body along a substantial portion of a length of the web.

Preferably, the pusher accommodates a second and smaller pusher.

According to an aspect of the invention there is provided a pusher device in combination with a lid and processing bowl of a food processor, the lid having a feed tube, the bowl having a handle, wherein:
  the feed tube cooperates with a longitudinal slot for receiving the safety rail, the channel having an opening through which protrudes, from an external housing, a nose of an upper link that pivots in response to contact with the safety rail;
  a linkage assembly in the external housing extending from the upper link to a projection that forms a terminal part that extends to contact a first intermediate link contained in the handle of the bowl.

Preferably, the channel further comprises a neck for receiving the safety rail. More preferably, the nose of an upper link being in the form of a roller for engaging the safety rail. Most preferably, a nose of an upper link engages the flat capping of the safety rail.

Preferably, the slot further comprises a relief area that is substantially exposed to an interior of the feed tube and that receives the safety rail.

Preferably, the nose of the upper link is in the form of a roller that protrudes through the opening. More preferably, the roller is carried by a pivot pin that interconnects upper link and a second link, the second link being pivotally coupled to an elongated third link, the lower end of the third link comprises a tab that extends out of a lower extremity of the lid housing. Most preferably, the tab comprises a surface that can acts on a cooperating second angled tab formed by an upper end of an intermediate link, the intermediate link being biased upward such that it can be lowered when acted on by the third link; the intermediate link carrying a downward extending finger for operating a switch.

Preferably, the nose of the upper link that protrudes through the opening is generally "U" shaped in cross section. More preferably, the nose has side walls defining a cup, an interior of the cup supporting a second intermediate link, a lower extent of the second intermediate link being pivoted to an upper portion of a lower link, the lower link terminating in the protrusion. Most preferably, a middle portion of the second intermediate link is bent, forming an elbow that is adapted to receive a tip of the upper link when the upper link pivots during a downward motion of the safety rail.

According to an aspect of the invention there is provided a food processor apparatus comprising a safety linkage mechanism that cooperates with a safety rail formed on the feed tube; the safety linkage mechanism being adapted to cooperate with a pusher, such that motor of the food processor will not operate unless the safety rail is in engaged with the safety linkage mechanism.

Preferably, the food processor apparatus includes a user interface having a display screen that depicts a graphic message to a user to insert the pusher if the pusher is not present in the feed tube.

Preferably, the food processor apparatus includes a user interface having a display screen substantially as herein described with reference to any one of the embodiments.

According to an aspect of the invention there is provided a food processor apparatus comprising:

a bowl having female bayonet features; and a lid having cooperating male bayonet features that engage with the female bayonet features of the bowl;

wherein the female bayonet features comprise downward inclination that causes the lid to be driven toward the bottom of the bowl during lid rotation, such that the rotation urges a seal into contact with an angled contact section in an upper rim area of the bowl.

According to an aspect of the invention there is provided a food processor apparatus comprising:

a bowl having female bayonet features; and a lid having cooperating male bayonet features that engage with the female bayonet features of the bowl;

wherein the bayonet features are substantially as herein described with reference to any one of the embodiments.

According to an aspect of the invention there is provided a food processor apparatus comprising:

a bowl; and a lid with a feed tube;

wherein the bowl is adapted to receive an inner bowl.

Preferably, the inner bowl has a generally cylindrical body that extends upwardly to a conical flare 101 having an upper rim, such that the diameter of the upper rim is sufficient to contain the output opening of the feed tube.

Preferably, the inner bowl is substantially as herein described with reference to any one of the embodiments.

According to an aspect of the invention there is provided a food processor apparatus comprising:

a bowl; and a lid with a feed tube; and a spindle that retains a cutting blade; and a bushing assembly with a metal cap mounted in the lid for cooperating with a tip of the spindle.

Preferably, a tip of the spindle is sintered and further comprises an array of lower relief projections adapted to engage cooperating sleeves associated with food processor blades or tools.

Preferably, the spindle is substantially as herein described with reference to any one of the embodiments.

According to an aspect of the invention there is provided a food processor apparatus comprising:

an adjustable thickness cutting blade.

Preferably, the adjustable thickness cutting blade is substantially as herein described with reference to any one of the embodiments.

According to an aspect of the invention there is provided a food processor apparatus comprising:

a whisking disc accessory.

Preferably, the whisking disc accessory is substantially as herein described with reference to any one of the embodiments.

According to an aspect of the invention there is provided a food processor apparatus comprising:

a four bladed cutting accessory.

Preferably, the four bladed cutting accessory is substantially as herein described with reference to any one of the embodiments.

According to an aspect of the invention there is provided a food processor apparatus comprising:

a base having a female coupling component a bowl; and a double ended drive coupling that extends through a floor of a bowl, the double ended drive coupling includes a lower male coupling and an upper male coupling; the lower male coupling component engages the female coupling component of the base; the upper male coupling component is affixed to an upper end of a drive shaft.

Preferably, between the upper and lower male coupling components, a sintered bush is moulded into a polymeric bushing sleeve, the bushing sleeve is carried by a soft polymeric boot.

Preferably, double ended drive coupling is substantially as herein described with reference to any one of the embodiments.

According to an aspect of the invention there is provided a food processor apparatus comprising:

a lid that is provided with a bushing assembly, wherein the bushing assembly acts as a spindle stabiliser.

Preferably, an exterior housing of the bushing assembly cooperates with the feed tube. More preferably, an elastomeric boot is between the bush assembly and the lid for reducing transfer of vibration from the spindle to the lid.

According to an aspect of the invention there is provided a food processor apparatus comprising:

a bowl coupling, wherein an "O" ring in a groove on the coupling retains a blade when the apparatus is tipped for pouring.

Preferably, the bowl coupling is substantially as herein described with reference to any one of the embodiments.

According to an aspect of the invention there is provided a pusher device for a food processor, the pusher having a body and a cap, the improvement comprising:

a safety rail that extends above a surface of the body of the feed tube in a "T" shaped section;

the "T" shaped section comprising a flat capping that is supported above the body by a web that is rigidly attached to the body at one or more locations along the length of the web.

According to an aspect of the invention there is provided a lid and processing bowl of a food processor, a pusher device, in combination with a pusher, the lid having a feed tube, the bowl having a handle, wherein:

the feed tube cooperates with a longitudinal slot for receiving the safety rail, the channel having an opening through which protrudes, from an external housing, a nose of an upper link that pivots in response to contact with the flat capping of the safety rail;

a linkage assembly in the external housing extending from the upper link to a projection that forms a terminal part that extends to contact a first intermediate link contained in the handle of the bowl.

Accordingly, in one embodiment of the invention a food processor is provided with a safety linkage mechanism that cooperates with a safety rail formed on the feed tube. The motor of the food processor will not operate unless the safety rail is in engagement with the safety linkage mechanism. A display may provide and indication to the user when the power is on but the safety rail is not in contact with the safety linkage mechanism.

In another embodiment of the invention a food processor is provided with a safety linkage mechanism that cooperates with a safety rail formed on the feed tube. The motor of the food processor will not operate unless the safety rail is in engagement with the safety linkage mechanism. The safety linkage mechanism further comprises an upper linkage that is pivotally attached to a housing associated with the feed tube, a lower linkage having a finger that extends from a lower extremity of the housing and between these two linkages, a contacting surface or roller that is adapted to make contact with a safety rail of the pusher.

Accordingly, in one embodiment of the invention a food processor is provided with a safety linkage mechanism that cooperates with a safety rail formed on the feed tube. The motor of the food processor will not operate unless the safety rail is in engagement with the safety linkage mechanism. A safety rail of the pusher cooperates with a neck of a pilot opening that is shaped to receive it. The pilot is associated with relief area in the feed tube.

Accordingly, in one embodiment of the invention a food processor is provided with a safety linkage mechanism that cooperates with a safety rail formed on the feed tube. The motor of the food processor will not operate unless the safety rail is in engagement with the safety linkage mechanism. A safety linkage mechanism associated with the feed tube cooperates with an intermediate link that passes through a handle of the food processing bowl.

In selected embodiments of the invention, the feed tube of a food processor is associated with a safety mechanism that prevents the motor of the food processor from rotating unless the pusher is inserted into the feed tube. A display screen is provided. The display screen depicts a graphic message to a user to insert the pusher if the pusher is not present in the feed tube. The display is also adapted to depict an overload warning.

In some embodiments of the invention, the bowl of the food processor has a lid with male bayonet features that engage with cooperating female bayonet features in the bowl. A downward inclination of the ramps of the female bayonet features cause the lid to be driven toward the bottom of the bowl during lid rotation. This rotation urges a seal into contact with an angled contact section in the bowl's upper rim area.

In another aspect of the invention, the bowl of the food processor is adapted to receive a smaller, inner bowl.

In another aspect of the invention, the food processor has a spindle that retains a cutting blade. A lid mounted bushing assembly with a metal cap cooperates with a tip of the spindle. In preferred embodiments, a tip of the spindle is sintered and further comprises an array of lower relief projections adapted to engage cooperating sleeves associated with food processor blades or tools. In other embodiments, the bushing further comprises an elastomeric vibration damping insert.

In other aspects of the invention, an adjustable thickness cutting blade is provided.

In further embodiments of the invention, a whisking disc accessory is provided.

In yet other embodiments of the invention, a four bladed cutting accessory is provided with a moulded polymeric cover.

In further embodiments of the invention, a double ended drive coupling extends through a floor of a bowl of a food processor. A lower male coupling component engages the food processor base's female coupling component. An upper male coupling component is affixed to an upper end of a drive shaft. Between these two male coupling components, a sintered bush is moulded into a polymeric bushing sleeve. The bushing sleeve is carried by a soft polymeric boot.

In further aspects of the invention, the lid of a food processor is provided with a bushing assembly. The bushing assembly acts as a spindle stabiliser. An exterior housing of the bushing assembly cooperates with the feed tube to provide an effectively greater cross sectional area in the interior of the feed tube.

BRIEF DESCRIPTION OF THE DRAWING FIGURES

In order that the invention be better understood, reference is now made to the following drawing figures in which:

FIG. 1 is a perspective view of a food processor;
FIG. 2 is a top view of a base of a food processor;
FIG. 3 is a detail of the top view of FIG. 2 illustrating the display and its warnings;
FIG. 4 is a perspective view of a food processor illustrating certain components of a safety mechanism;
FIG. 5 is a cross section of the food processor shown in FIG. 1;
FIG. 6 is an exploded perspective view of a safety mechanism;
FIG. 7 is a cross sectional view of a bowl, lid and pusher;
FIG. 8 is a cross section similar to FIG. 7 but with the pusher fully inserted;
FIG. 9 is a perspective view, broken away to illustrate a bowl and its lid detent mechanism;
FIG. 9A is an exploded perspective view illustrating the feed tube, channel and shroud;
FIG. 9B is an exploded perspective illustrating the upper extent of the feed tube and the shroud;
FIG. 9C is a top perspective view illustrating the lower extent of the safety mechanism's channel;
FIG. 9D illustrates the assembly of the lid's safety mechanism components;
FIG. 9E is a sectional perspective illustrating the interior of the channel;
FIG. 10 is a top perspective view of the linkage cover;
FIG. 11 is a perspective view of the linkage housing illustrating the slot;
FIG. 12 is a top perspective view of a lid and feed tube;
FIG. 13 is an inverted perspective view of the lid and feed tube of FIG. 12;
FIG. 14 is a lid and feed tube shown in FIG. 12 and FIG. 13 partially sectioned;
FIG. 15 is a perspective view of a lid and feed tube;
FIG. 16 is an interior perspective view of the bowl illustrating bayonet features;
FIG. 17 is a cross sectional view of the interaction between bowl and lid;
FIG. 18 is an inverted perspective view of an inner bowl;
FIG. 19 is a perspective view, partially sectioned, showing the interior of a bowl and the coupling;
FIG. 20 is a cross section of a bowl, lid and inner bowl;
FIG. 20A is an exploded perspective view of a lid mounted journal assembly;
FIG. 20B is a cross sectional view of the apparatus depicted in FIG. 20A;
FIG. 21 is an exploded perspective of a spindle;
FIG. 22 is a cross section of the device depicted in FIG. 21;
FIG. 23 is a side elevation, assembled, of the device depicted in FIG. 21 and FIG. 22;
FIG. 24 is a perspective view of julienne disc, partially disassembled;
FIG. 25 is a perspective detail of the device depicted in FIG. 24;
FIG. 26 is an exploded perspective view of a disc an its two part coupling;
FIG. 27 is a top plan view of a dough blade;
FIG. 28 is a cross section of the device depicted in FIG. 27;
FIG. 29 is an exploded perspective view of an adjustable blade accessory;
FIG. 30 is an exploded perspective illustrating aspects of FIG. 29;
FIG. 31 is a cross section of the device depicted in FIG. 30;
FIG. 32 is a perspective view of a whisking accessory;
FIG. 33 is an inverted perspective of the device depicted in FIG. 32;

FIG. 34 is a cross section through a whisk accessory and spindle;

FIG. 45 is a cross sectional view of another pusher;

FIG. 46 is a cross sectional view of a further embodiment of a pusher; and

FIG. 47 is a cross sectional view of yet another embodiment of a pusher.

BEST MODE AND OTHER EMBODIMENTS

Figure 1:
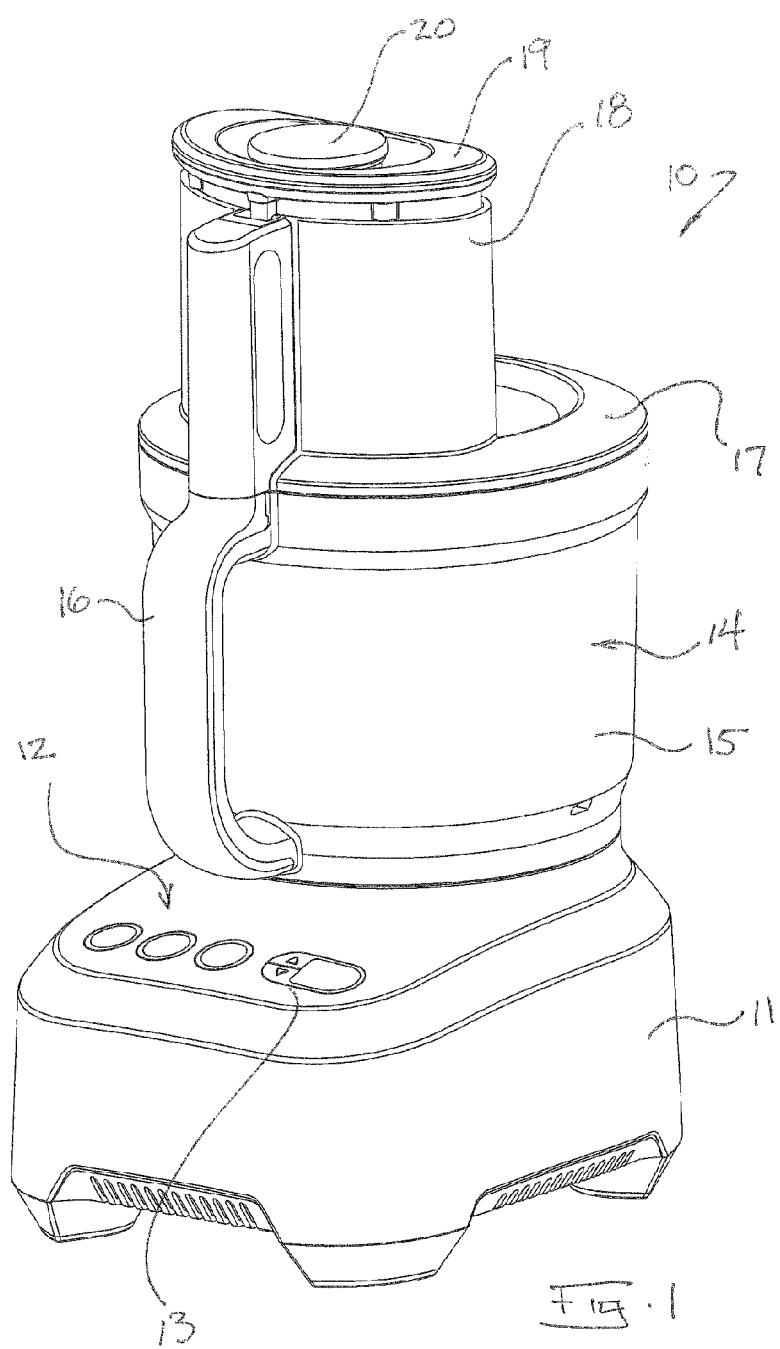

As shown in FIG. 1, a food processor 10 comprises a base with internal motor 11, user operated controls 12, an electronic display 13 and a processing container 14. The container 14 further comprises a bowl 15 with a handle 16 and a lid 17 with an integral and wide feed tube 18. The feed tube 18 receives a pusher 19. In this example, the pusher accommodates a smaller second pusher 20.

Figure 2:
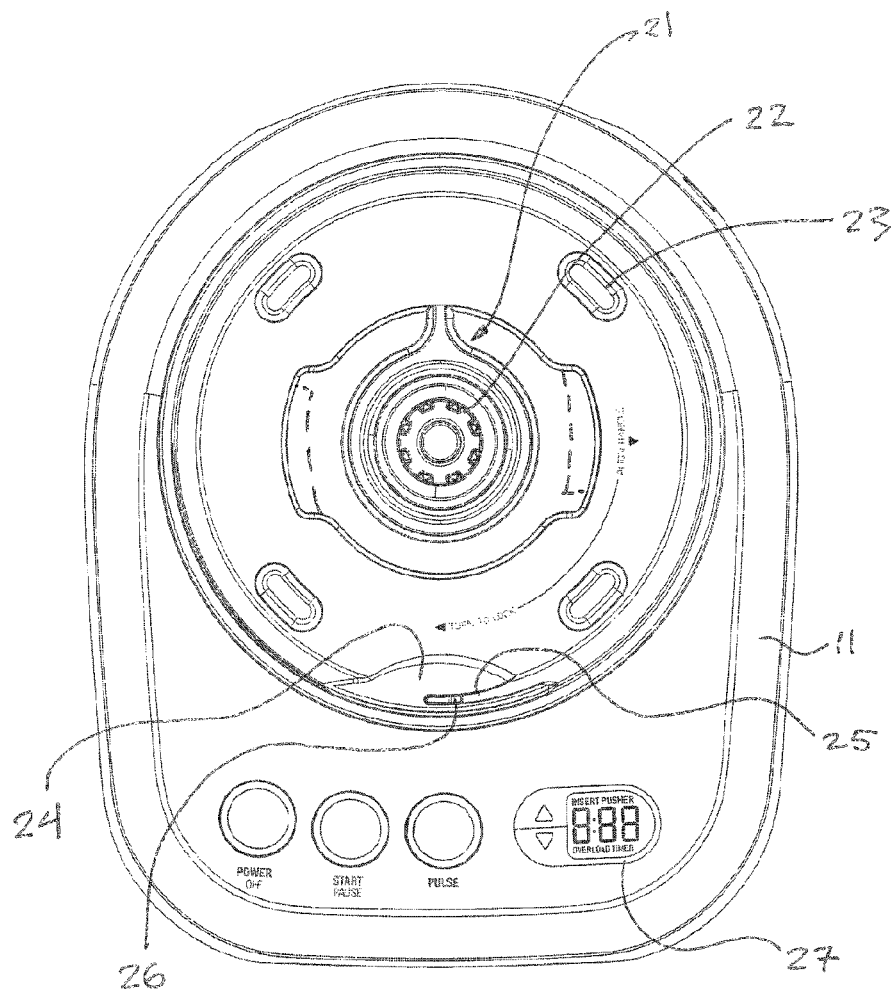
Figure 5:
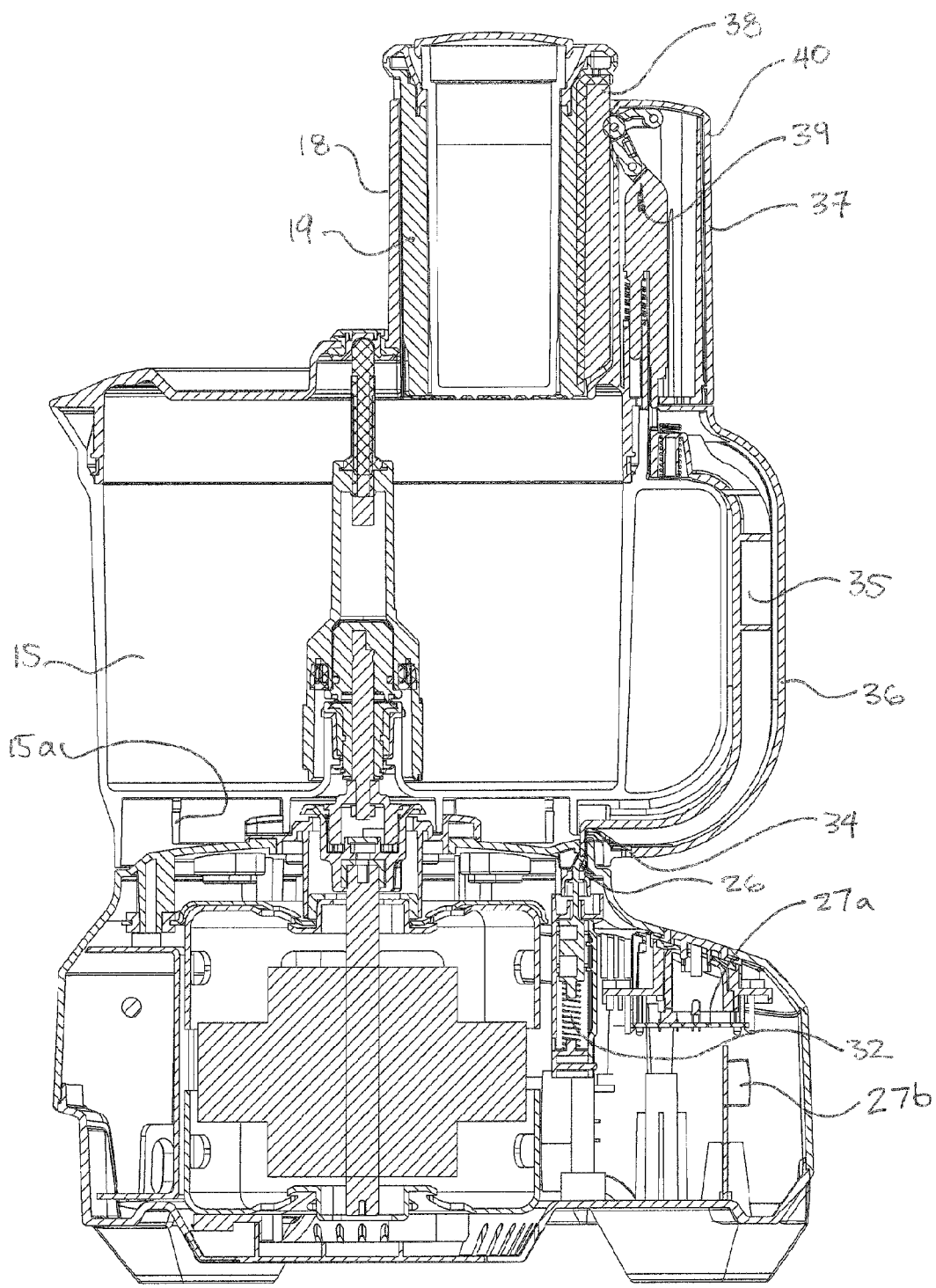

As shown in FIG. 2, the base 11 is formed from die cast metal. The uppermost surface features a polymeric, female bayonet fitting 21 for receiving and restraining the container 14. A female coupling component 22 is located within and protrudes through the bayonet fitting 21. The polymeric container 14 is supported above the upper surface of the die cast base by (in this example) four acetal wear pads 23 that prevent the bowl from contacting and thus scratching the coating on the die cast base. Thus, owing to the polymeric bayonet fitting 21 and the acetal pads 23, the bowl's contact with the base is limited to the underside of the descending inner rim 15a that is located below the floor of the bowl (FIG. 5). A portion of the upper surface comprises an integral guide 24 for the safety mechanism that is associated with the container's feed tube. The guide 24 comprises a small mound with an arcuate slot 25 within which is located a mechanical probe component 26 of the safety mechanism. The probe 26 exits the base through a waterproof cap 26a.

An upper surface of the base further comprises a display 27 such as an LCD display. Adjacent to the display there are user controls 28 for operating a timer that associates the display and its with the operation of the processor's motor and feed tube. The display 27 comprises an overload indicator 29 that indicates when the internal components of the processor get too hot. When this occurs, the device's micro processor 27a will shut down the motor and display a warning such as "overload". This lets the user know that the motor is not broken and that they must wait for the unit to cool down. The display 27 also contains a unique indication 30 that the pusher is not inserted in the feed tube. This indicator will be visible until the probe 26 is activated by the mechanical components associated with the feed tube's insertion.

Figure 4:
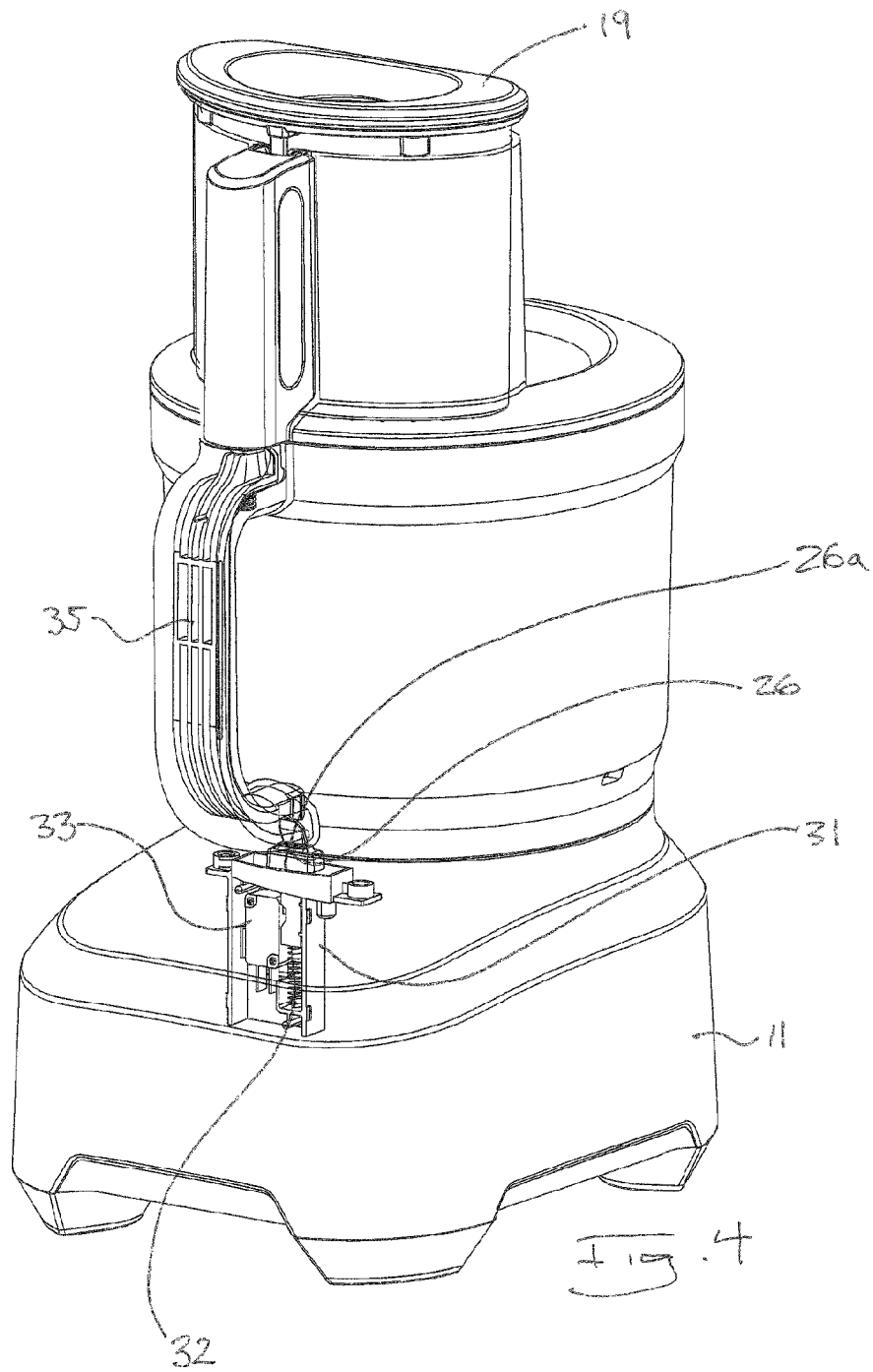

As shown in FIG. 4, the probe 26 is associated with an electromechanical safety mechanism 31 that is contained within the base 11. The probe is urged upward, for example, by a compression spring 32. When the probe is depressed by the actions resulting from the installation of the bowl and lid and the insertion of the pusher 19, a switch (by way of example only, a micro-switch) 33 is tripped, thus allowing power to be supplied to the motor, via instruction from the unit's microprocessor.

As shown in FIG. 5, the probe 26 is acted on by chamfered finger or projection 34 that forms the terminal part and lower end of a reciprocating intermediate mechanical link 35 that is carried within the hollow handle 36 of the bowl 15. This link is essentially "C" shaped. In FIG. 5, the intermediate link is shown in its lowermost position, having been urged downward by the action of the pusher 19 on the links located in the feed tube assembly 30.

As illustrated in FIG. 5, the essentially "D" shaped feed tube 18 is slotted to receive a longitudinal safety rail 38 carried by the pusher 19. As will be explained, the entry of the rail 38 into the feed tube channel causes the mechanical extension of a linkage assembly 39 that is contained within a linkage housing that is affixed to the feed tube 18. When the linkage assembly 39 is acted on by the feed tube's safety rail 38, it extends and acts on the intermediate link 35. Thus, the mechanical motion of the feed tube and linkage assembly 39 is transmitted to the probe 26.

As suggested by FIG. 5, insertion of the feed tube acts mechanically on the switch or micro-switch 33. Activation of the switch is sensed by the unit's micro processor or PCB 27b, thus allowing power to be supplied by the motor. If the motor is still running when the pusher 19 is removed from the feed tube 18, the D-activation of the switch 33 is also sensed by the micro processor or PCB 27B. In preferred embodiments, when the PCB 27b senses the removal of the feed tube 18 when the motor is still rotating, the PCB 27b activates electronic braking of the motor by using capacitors or similar components on the PCB or associated with the PCB. Electronic braking can also be implemented by applying a reverse voltage to the motor windings. This stops the unit's blades or discs from turning within a short time frame, approximately 2 seconds. This prevents the user from being able to access the interior of the feed tube and blades while motor rotation is still occurring. This same braking occurs when the lid 17 is rotated out of engagement with the bowl assembly 14, even before the lid is lifted off. This is because the intermediate link 35 in the bowl handle is deactivated equally by removal of the lid or removal of the pusher. If, on the other hand, the user presses the stop or pause buttons of the unit before the pusher is removed, a less forceful electronic brake is applied to the motor because the situation is not as unsafe as removal of the pusher is when the motor is turning. However, if the pusher is removed soon after the stop or pause buttons are activated by the user, the large braking force is applied by the microprocessor or PCB 27b.

Figure 6:
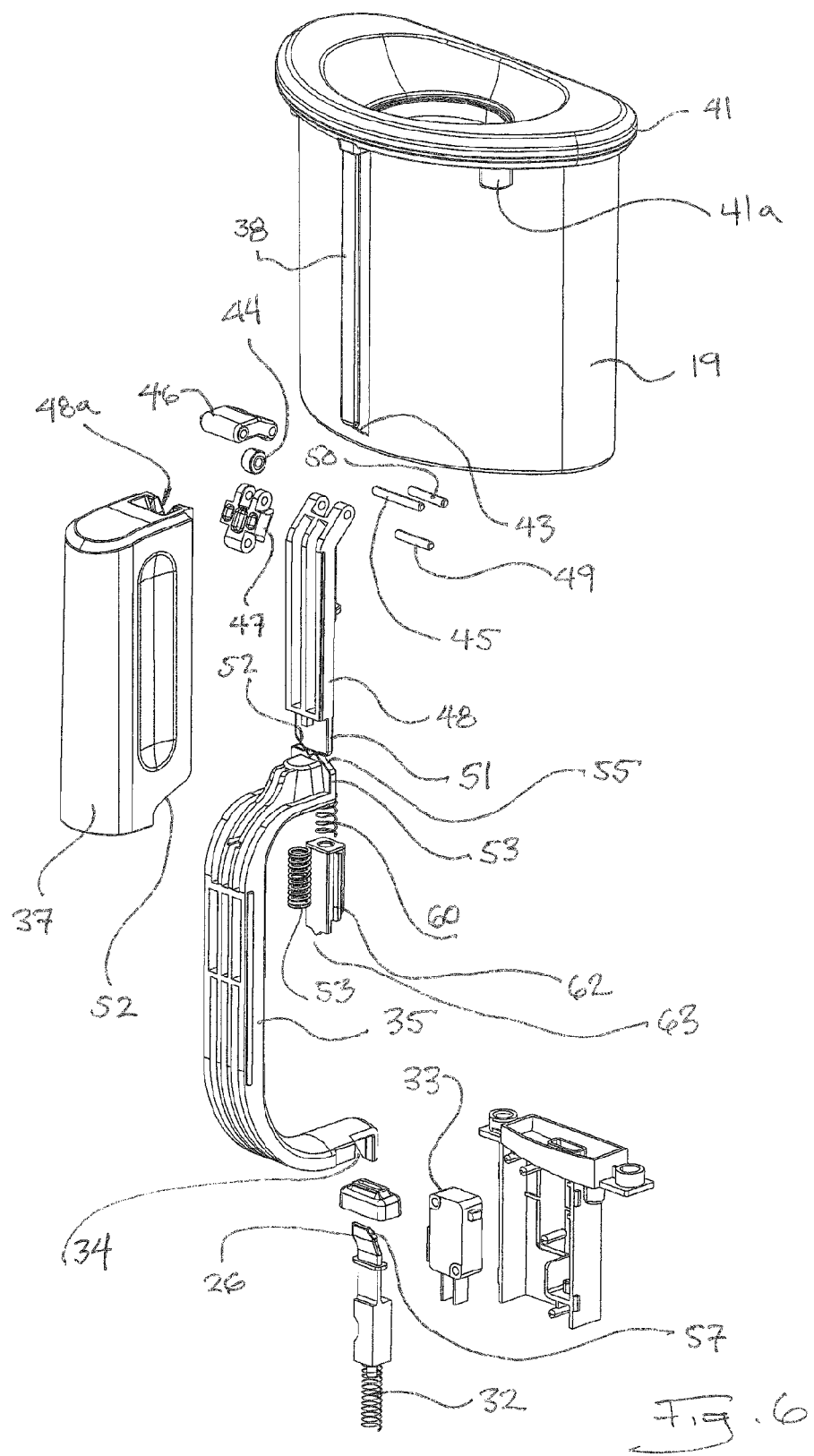

As shown in FIG. 6, the pusher 19 comprises a hollow "D" shaped body with a welded on cap having an upper peripheral rim 41. Stops 41a under the rim prevent finger pinching. Moulded into the body of the feed tube 18 is a safety rail 38. The safety rail 38 is attached to and extends above the surface of the body of the feed tube in a "T" shaped section having chamfered or inclined lower surface 43. In preferred embodiments, the insert moulded safety rail 38 is formed from a hard polymer such as an acetal polymer. The remainder of the feed tube need not be formed from such a hard wearing polymer. In preferred embodiments, the "T" shaped section of the safety rail comprises a flat capping portion that is supported above the body of the feed tube by a central flat web that is integral or moulded into the body for the purpose of rigidising the "T" shaped section relative to the body. The central web need not be contiguous, attached to or integral with the body along the entire length of the section, so long as the section remains rigid when acted upon by the user and the safety mechanism associated with the feed tube. The central web of the "T" shaped safety rail could be attached to or contiguous with the body along a majority or substantial portion of its length, at spaced apart portions along its length, or at each end, or along the entirety of its length. It is important, for ridgidity that is not be supported by the body by being attached at one end only. The safety rail is preferably "T" shaped but can also be "L" shaped, for example by having the central web along one edge of the flat capping.

When the safety rail 38 is inserted into the longitudinal slot 48a of the feed tube, it contacts a friction roller 44 that is carried by a stainless steel pivot pin 50 that interconnects a first link 46 and a second link 47. The second or middle link 47 is pivotally attached to an elongated third or lower link 48 by a second pivot pin 49. The first link is attached to the lid moulding by a longer third pivot pin 45. The second pivot pin 50 "floats" with the first and second link 46, 47. The lower end 51 of the third link comprises a chamfered finger or tab 52 that extends out of a lower extremity of the housing 37. This first tab 51 comprises an angled or ramped surface 52 that acts on a cooperating second tab 53 that forms the upper end of the intermediate link 35. The intermediate link 35 is urged upward by a compression spring 54 so that it can be lowered when acted on by the third link 48. Because the second tab has an angled surface 55 that cooperates with the ramp 52, it can be depressed by rotation of the lid onto the bowl, even when the pusher 19 is present within the feed tube 18. As shown in FIG. 6, the intermediate link 35 carries a downward extending third tab or finger with an angled ramp 34 that acts on a ramped surface 57 of the probe 26. Thus, the bowl can be rotated into engagement with the base, even when the pusher 18 is inserted into the feed tube and the lid is affixed to the container.

Figure 7:
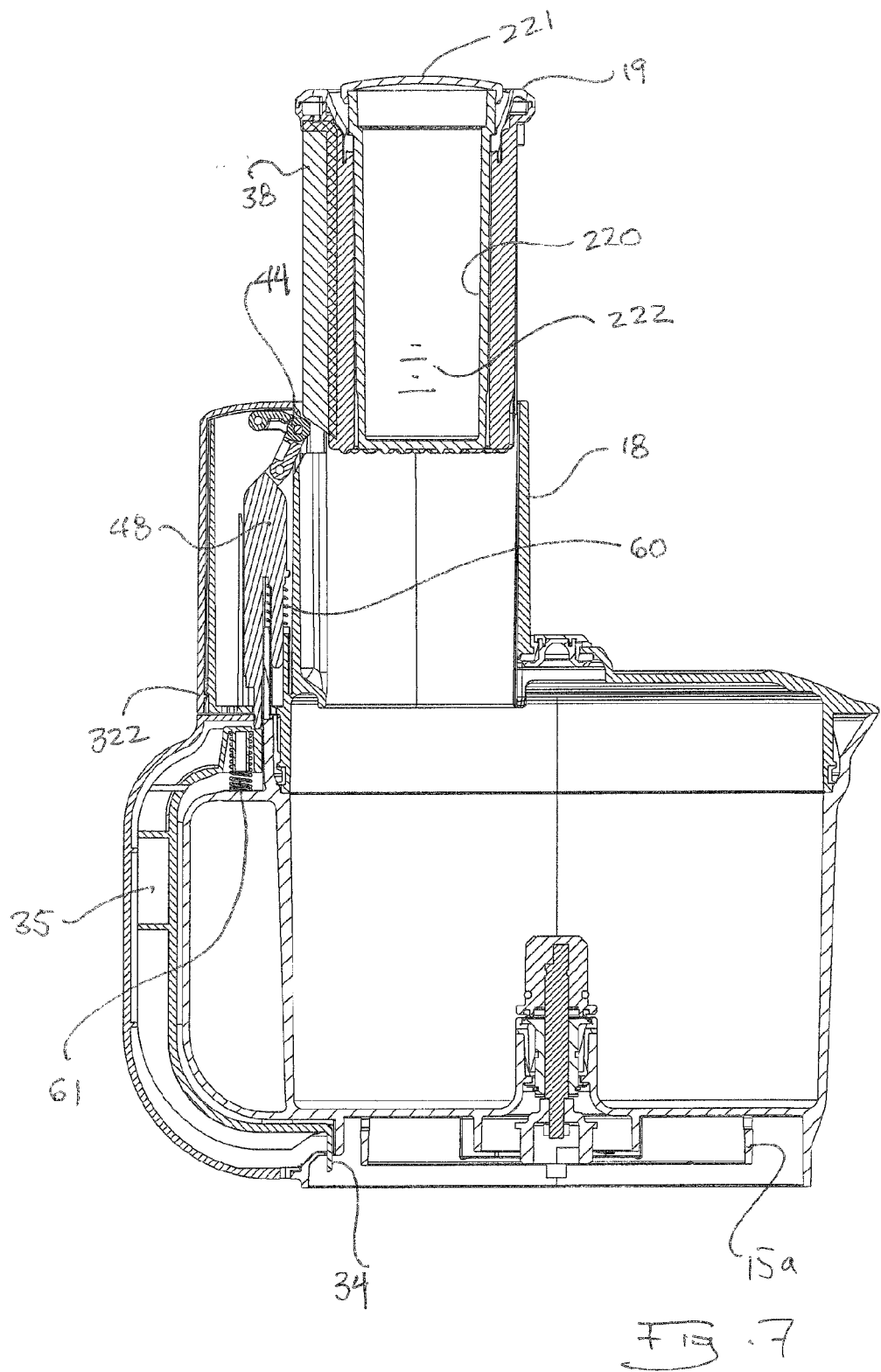
Figure 8:
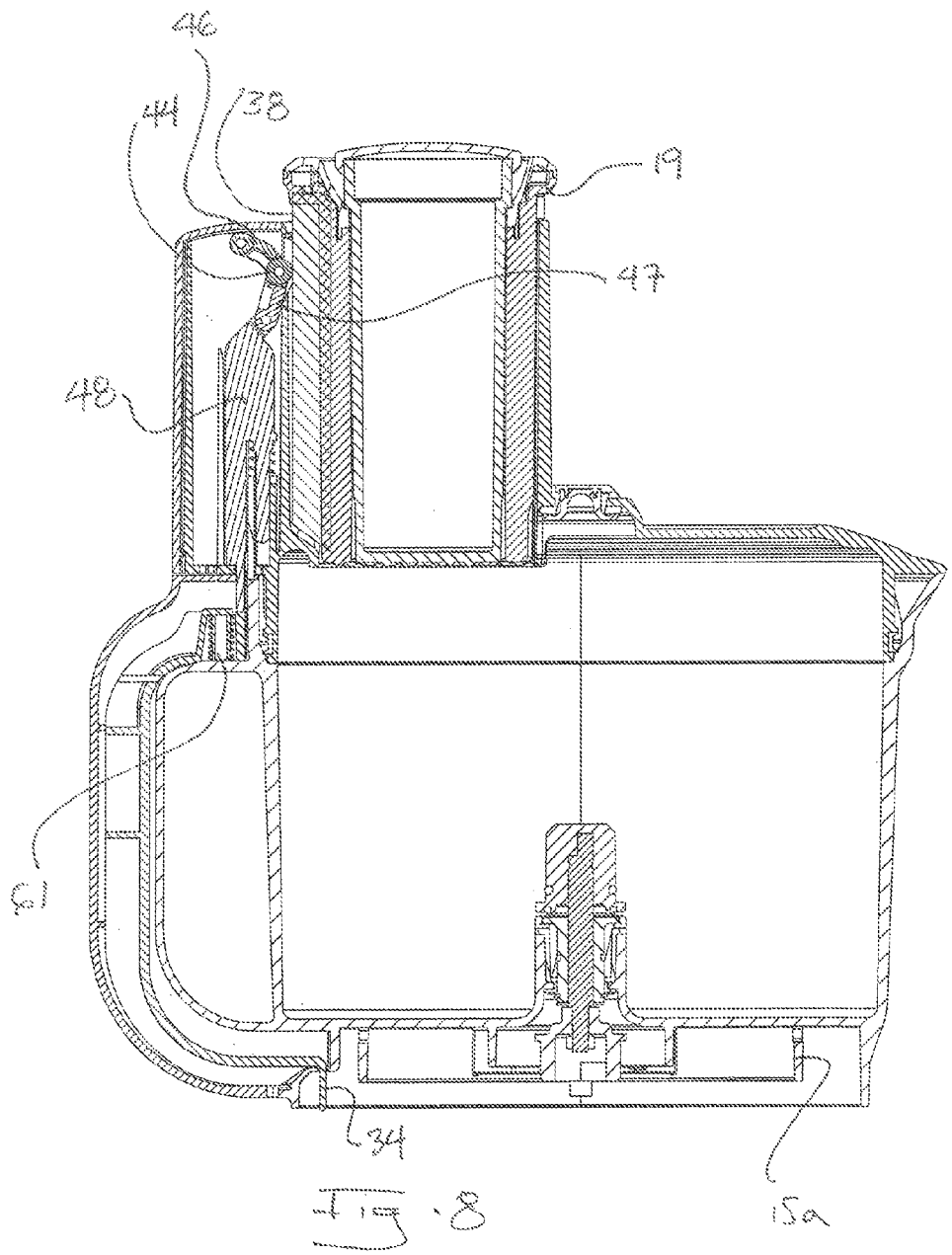

The mechanical aspects of the safety mechanism are illustrated in FIG. 7 and FIG. 8. As shown in FIG. 7, the rest position for the assembled safety mechanism is when the pusher 19 is not inserted into the feed tube 18. In this orientation, an internal compression spring 60 urges the third link 48 upward or toward the upper opening of the feed tube 18. This mechanical bias urges the roller 43 toward the feed tube and more particularly into surface contact with the safety rail 38 when it is present. In this orientation, the third link 48 does not exert any downward pressure on the intermediate linkage 35. Thus, the compression spring 61 within the hollow handle urges the intermediate link 35 upward such that the lower finger or tab 56 of the intermediate link 35 will not make contact with the probe 26 when the bowl is installed onto the base 11. FIG. 7 also illustrates that the transparent cylindrical inner pusher 220 has a flexible and removable cap 221. The inner pusher can be calibrated 222 to use as a measuring tool.

As shown in FIG. 8, insertion of the pusher 19 causes the safety rail 38 to impinge on the roller 43. This causes the first and second links 46, 47 to elongate, driving the third link 48 downward. This causes the third link's lower tab 51 to contact the upper tab 55 of the intermediate link. This force overcomes the upward bias of the spring 61, displacing the intermediate link toward the probe 26.

Figure 9:
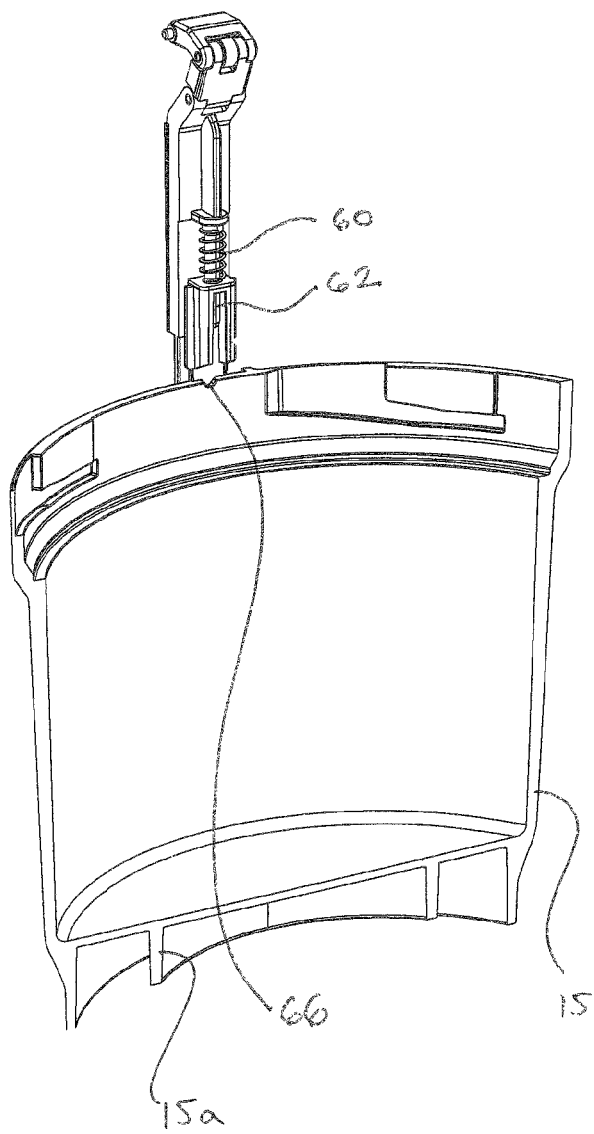

As suggested by FIG. 6 and FIG. 9, a spring loaded detent mechanism provides user feedback and anti-rotation functionality to the engagement between the lid 17 and the bowl 15. Contained within the linkage housing 37 is a follower 62 that is able to reciprocate within the housing 37 but which is urged downward by the same spring 60 that urges the third link 48 upward. This follower 62 has a downward extending "V" shaped or other shaped beak 63 defined by ramped surfaces. When the lid 17 and the bowl 15 are properly aligned, the beak 63 will be urged into cooperation with a "V" shaped or other shaped cooperating detent or notch 66. This creates feedback in the form of an audible "click" (or a perceptible tactile engagement) so that the user can better establish engagement between the lid and bowl. The force of the spring 60 can be overcome by user rotation of the lid 17 relative to the bowl 15. However, the engagement between the beak 63 and the detent 66 cannot be overcome by vibration induced counter rotation of the lid 17.

Figure 9A:
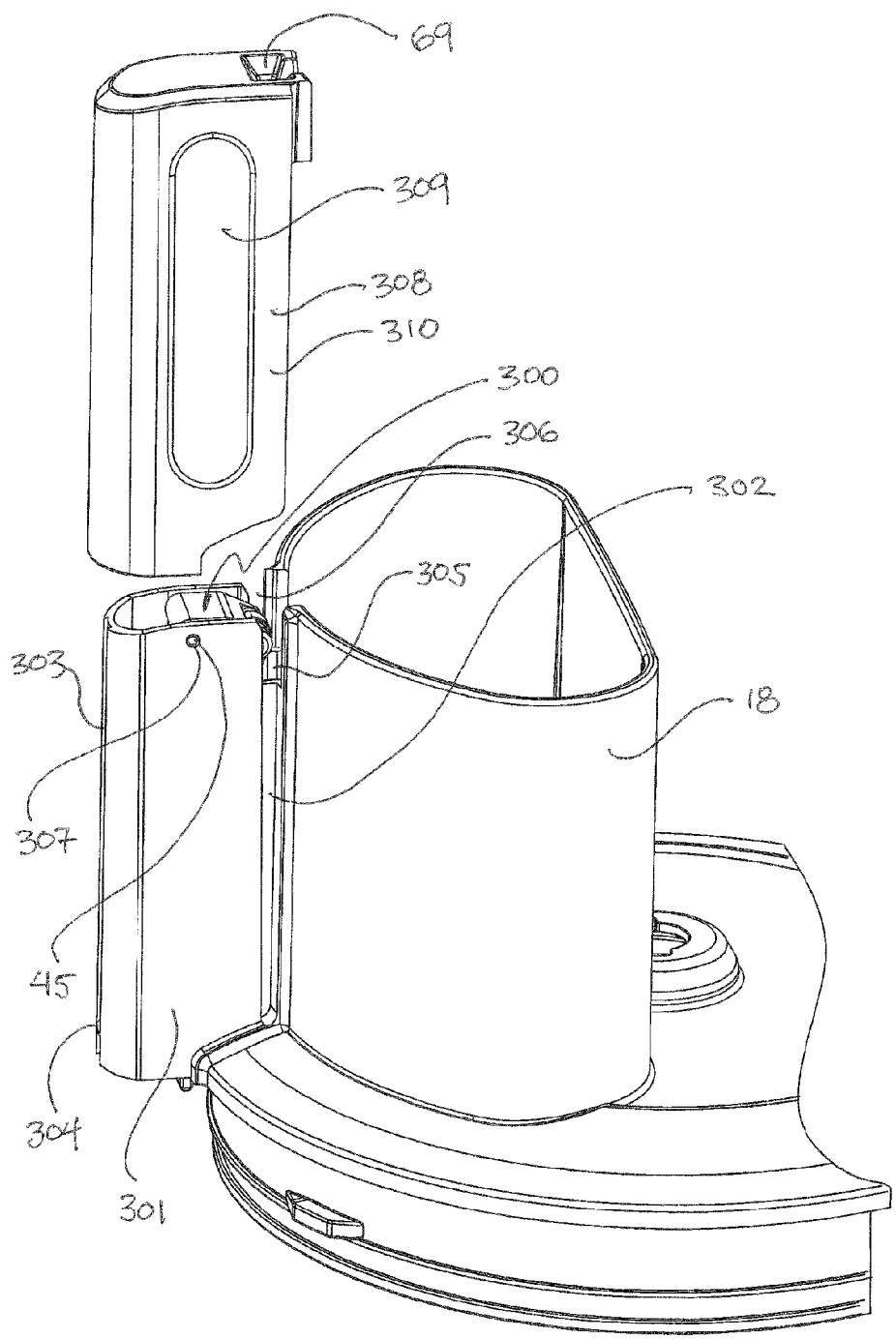

As shown in FIG. 9A, the first, second and third links of the safety mechanism 300 are contained within a "U" shaped longitudinal channel 301 that is integrally moulded with the feed tube 18. A pair of guide slots 302 are formed between the channel 301 and the main "D" shaped body of the feed tube 18. The channel 301 further comprises a third groove 303, facing outward and located along the midline of the channel 301. A small rib or catch 304 is located close to the bottom of the groove 303. A pair of through slots 305, 306 space the upper interior edges of the channel 301 from the main "D" shaped body of the feed tube 18. An upper extent of the channel 301 comprises a pair of opposing through holes 307 that are adapted to receive the pivot pin 45. In preferred embodiments, the length of the pin 45 is sufficient to extend between the two openings 207 without extending past the outer surface of the channel 301. An acetal polymer sheath 308 slides over the channel 301, as will be explained. The sheath 308 provides optional recessed or textured grip areas 309 and further comprises the "T" shaped pilot depicted in FIG. 10. The proximity of the side walls 310 of the sheath 308 to the ends of the pivot pin 45 prevent the pin 45 from escaping after the sheath 308 is in stalled.

As shown in FIG. 9B, the sheath 308 has a front opening 320 adapted to receive the channel 301. The front opening 320, at a lower extent, is bounded by a pair of guide flanges 320 adapted to slide within the guide slots 302. Also seen is the longitudinal neck 71 with "V" shaped relief areas 72, 73. The neck area 71 captures the "T" shaped safety rail 38 and prevents it from escaping or loosing engagement with the roller 44. The relief areas 72, 73 allow for angular misalignment of the pusher. The shroud 308 further comprises an internal lower portion and a locking ramp 322. The locking 322 is adapted to slide within the guide slot 303, ride over the catch 304 and engage with the catch so as to prevent inadvertent withdrawal of the shroud 308. The side walls of the neck area 71 enter the through slots 305, 306 (see FIG. 9A) and further stabilise the upper portion of the shroud 308.

As shown in the top perspective view of FIG. 9C, the lower extremity of the channel 301 comprises a sub-floor 330 in which is formed a drain opening 331. The interior side walls of the channel 301 support four guide rails 332. The guide rails 332 restrain the motion of the third link to essentially vertical reciprocating motion so that the lower tab 51 of the third link can pass through an opening 333 located adjacent to the sub-floor 330. Additional drain holes 334 are provided at the lower extremity of the channel 301, as required. FIG. 9A and FIG. 9B also illustrate an integral partition or web 335 that isolates the interior of the channel 301 from the interior of the "D" shaped main body of the feed tube 18. A relief opening 336 located above the partition 335 allows the roller 44 to make contact with the safety rail.

Figure 9D:
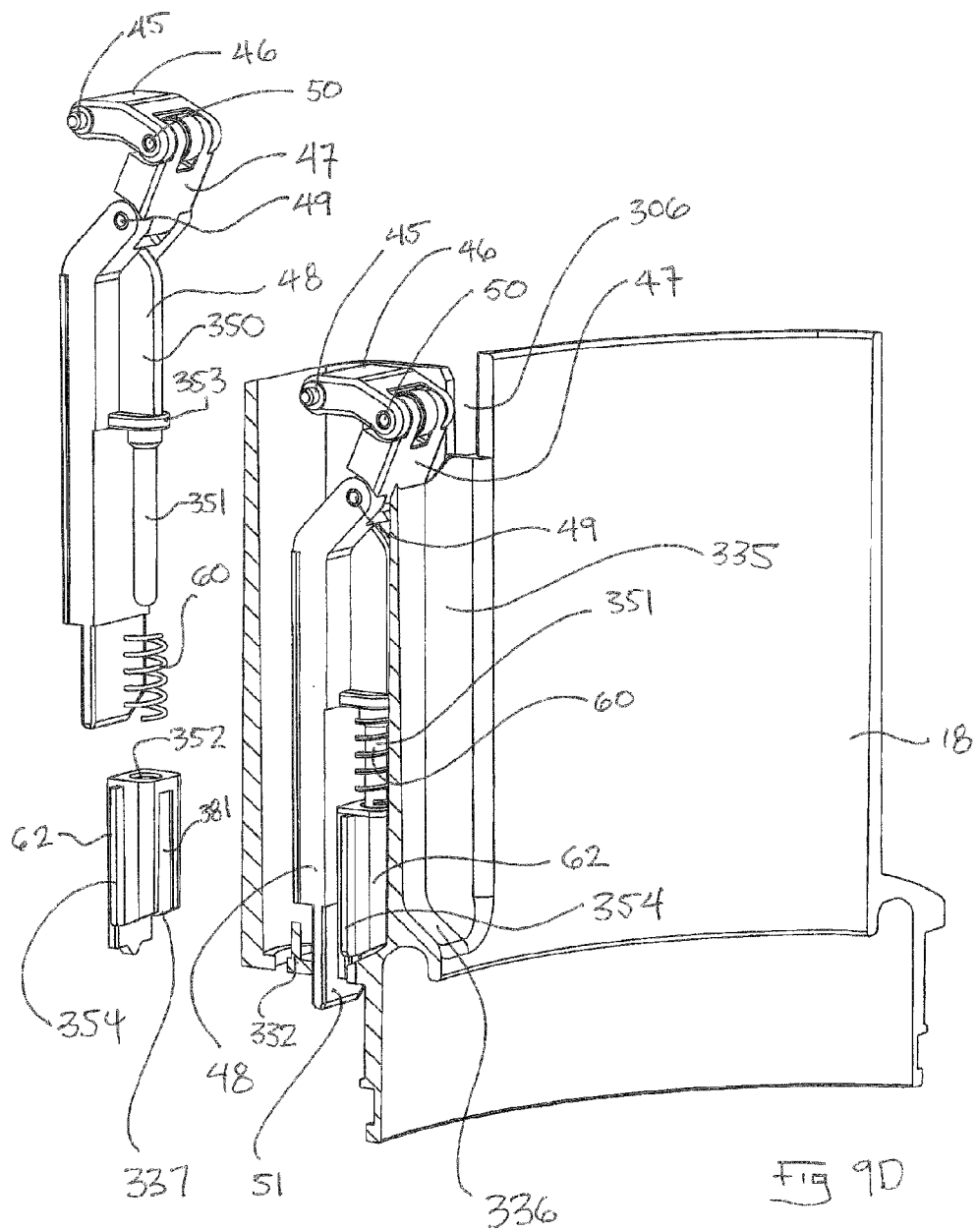

As shown in FIG. 9D, the third linkage 48 further comprises a medial rib 350 that terminates in an integral guide pin 351. The guide pin 351 cooperates with an alignment opening 532 in the reciprocating follower 62. The compression spring 60 surrounds the guide pin 351 and is interposed between the follower 62 and an upper retaining flange 353 located at the upper extent of the guide pin 351. The follower 62 has longitudinal side rails 354 that stabilise the motion of the follower 62 with respect to the guide rails 332. FIG. 9D also illustrates that the internal surfaces of the partition 335 are blended into the interior of the guide tube 18 and that the lower extent of the partition 336 slopes downward and blends with the interior of the feed tube to promote the discharge of waste and cleaning when required.

Figure 9E:
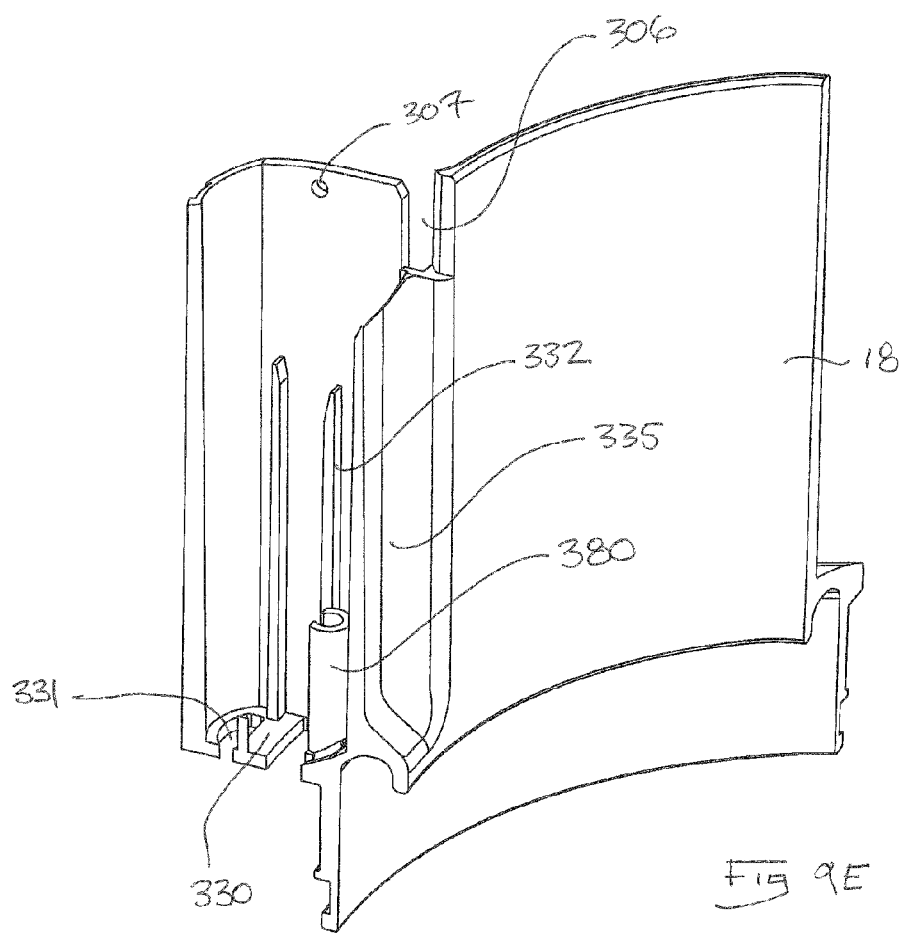
Figure 12:
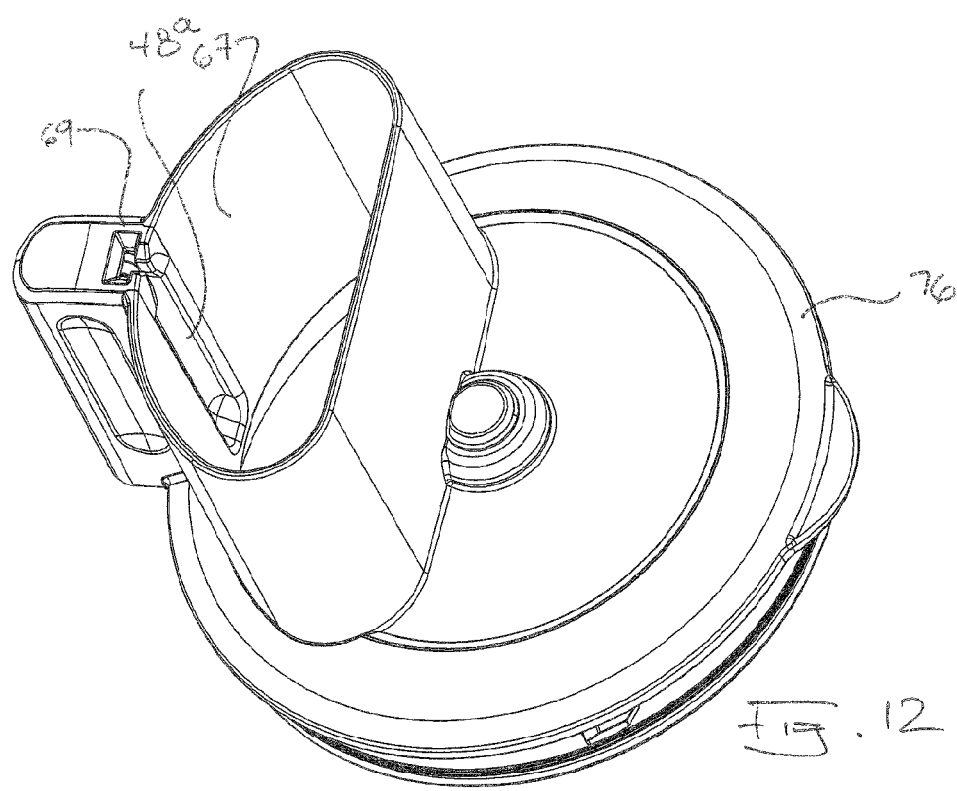

An under surface 337 of the follower 62 comprises an opening that slides over a guide tube 380 as shown in FIG. 9E.

As illustrated in FIG. 9E a guide tube 380 is integrally moulded at a lower extent of the channel's interior. The guide tube 380 receives the tip of the guide pin 351 and is captured by a longitudinal slot 381 on a surface of the follower 62.

The relationship between the longitudinal slot in the feed tube 18 and the linkage housing 37 is further illustrated in FIG. 10 through FIG. 14. As shown in FIGS. 10 and 11, the longitudinal slot 48a is preferably formed along the middle of the arc-shaped sidewalls 67 of the feed tube 18. The linkage cover 37 protects and locates the internal links in the proper orientation. An upper extent of the slot 68 provides a "T" shaped pilot opening 69 that is preferably moulded from a hard wearing polymer such as an acetal. The remainder of the feed tube and the linkage housing need not be formed from a hard wearing polymer. The "T" shaped pilot is adapted to receive the "T" shaped safety rail 38. When the safety rail is inserted into the pilot 69 the tapered or angled lower portion 43 of the rail 42 first contacts the roller 44.

As shown in FIG. 11, the pilot opening 69 in the acetal moulding 70 further comprises a longitudinal neck 71 having "V" shaped relief areas 72, 73 above it and below it. In this way, the safety rail 38 is capable of operating smoothly and with minimal stress even when somewhat misaligned, for example, during the early part of its insertion into the slot. The slot 48a further comprises a relief area 74 that extends substantially the entire length and defines the back wall of the slot. Thus, the feed tube engages the pusher only in the area associated with the pilot opening 69 and neck 71. The relief area 74, because it is entirely or at least substantially exposed to the interior of the feed tube and being the width of the slot below the neck is incapable of trapping dirt or food particles that may enter through the pilot opening 69.

Figure 43:
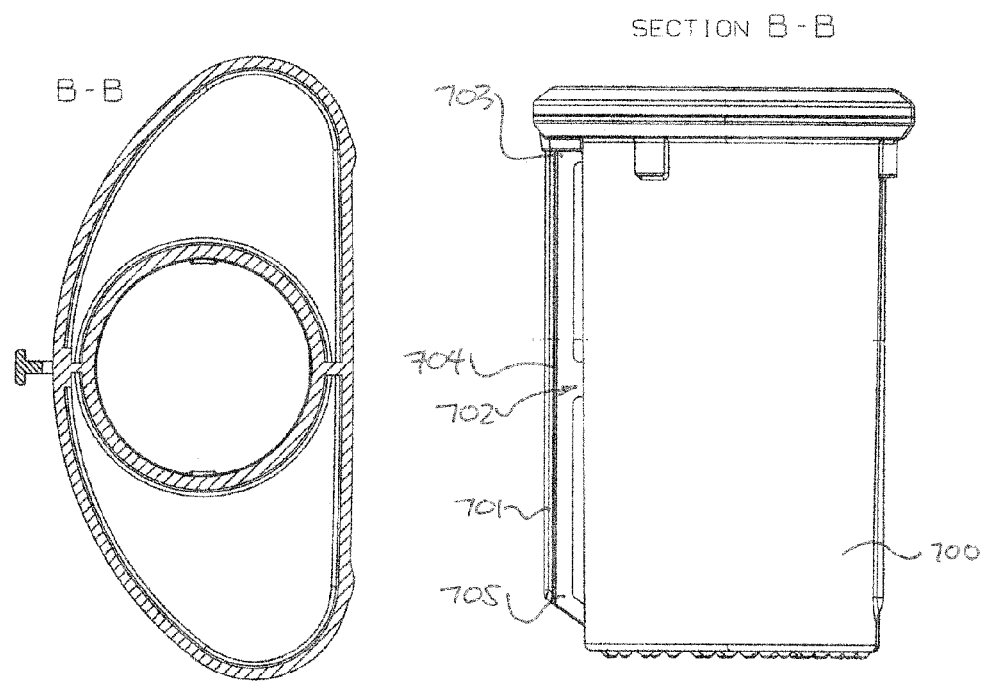
FIG. 43 is a side elevation of a pusher in accordance with the teachings of the present invention.
Figure 44:
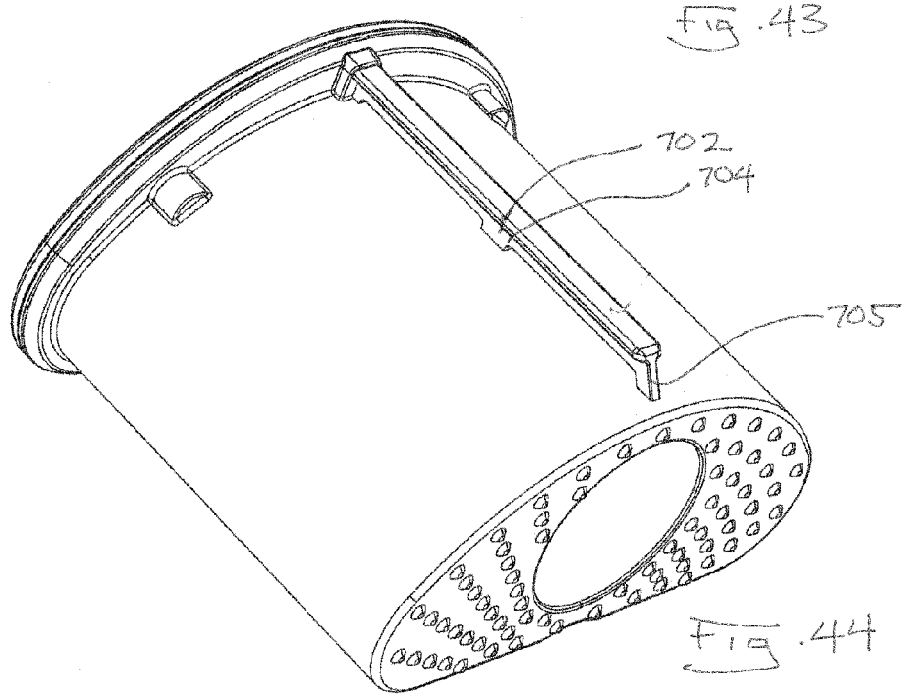
FIG. 44 is a perspective view of the pusher shown in FIG. 43.

As shown in FIG. 14, the tapered pilot opening 69 receives the pusher's safety rail 38. It can be seen that the safety rail 38 is "T" shaped in cross section. A proximal terminal end of the rail 75 is moulded into or integral with the pusher 19 whereas the remainder forms the external "T" shaped part that enters and exits the slot 48a through the pilot 69. Longitudinal, rounded and blended ribs 19a are spaced apart to help locate the flat back of the pusher 19 in the feed tube and reduce friction and binding. FIG. 14 also illustrates that the vertical motion of the pusher 19 is largely determined by the relationship between the safety rail 38 and the pilot 69. As previously mentioned, the pilot is preferably moulded from a hard wearing polymer that forms a longitudinal neck 71 having "V" shaped relief areas 72, 73 above and below. This forms a motion trap for the safety rail. In the example of FIG. 14, movement of the feed tube away from the rotational centre of the motor is limited by the friction roller 44 or equivalent wear surface of the safety linkage. Movement toward the centre line of the motor is resisted by contact between the underside of the transverse head of the "T" section and the adjacent interior flat surfaces of the pilot. By limiting the motion of the feed tube in this way, excess binding of the pusher in the feed tube is minimised. Further examples of this method of limiting the motion of the pusher are suggested in FIG. 43 through FIG. 47. As shown in FIG. 43, the pusher 700 may have a safety rail 701 having a flat central web 702 that is attached at spaced apart locations 703, 704, 705 to the feed tube. These points of attachment may be integral with the feed tube or by way of moulding or other affixation to the feed tube 700. In this example and as illustrated in FIG. 4, the safety rail is "T" shaped. Having continuous or spaced apart attachment of the guide rail to the pusher increases the strength, rigidity and stability of the safety or guide rail relative to those types that are only attached to the pusher at pusher at one end.

It will also be understood that utilising the aforementioned principle of motion capture of motion or limiting, the safety rail can have different geometries. Examples of such geometries are provided in FIG. 45 through FIG. 47. It will be understood that when a particular shaped safety rail is provided, that the shape of the pilot must compliment it. It will also be understood that those surfaces furthest from the centre line of the pusher will be those surfaces that are contacted by the safety linkage assembly. This contact may be against a friction roller, as suggested by FIG. 5 through FIG. 9 or against sliding contact surface, as suggested, for example in FIG. 38 through FIG. 40. Similarly, motion in the opposite direction, that is toward the centre line of the pusher or the motor is accommodated by a complimentary or underside surface of the safety rail in contact with a cooperating surface on or associated with the pilot. Previous examples have illustrated a contact surface on the pilot formed from a hard wearing material (for example compound or polymer). It will be appreciated that anti friction rollers may also be used in this area. As shown in FIG. 45, a safety rail 706 of a pusher 707 may comprise an arrow shape. In this example, the safety rail 706 has a head 708 having a flat underside 709 and an extremity 710 in the form of a point. The head 708 thus forms a triangle of equal sides that presents a "V" shaped contact surface to the safety linkage mechanism. Thus, contacting any friction roller on the safety linkage mechanism may have a "V" shaped cooperating groove to receive and centre the head of the safety rail 706. As shown in this example, the safety rail 706 may be moulded into and formed from a different material than the pusher 707.

As shown in FIG. 46, the safety rail 711 may be in the form of an inverted, truncated, equilateral triangle. In this example, the outer most surface or contact surface of the safety rail 711 is flat whereas the underside surfaces 713 are tapered and extend from the edges 714 of the contact surface 712 toward a narrowing 715 where the safety rail makes contact with the outer surface of the pusher 716. As previously suggested, those surfaces in contact with the safety rail 711 may do so via anti-friction rollers or by simple sliding contact.

As suggested by FIG. 47, the safety rail 720 may be "L" shaped in cross section. This shaped safety rail present a transverse contact surface 721 to the safety linkage mechanism. As with the "T" shaped safety rail, the underside surface 722 is parallel with the opposing contact surface 721.

As will be appreciated by the aforementioned examples, limiting the motion of the pusher is accomplished by trapping the safety rail between the pilot and the resiliency or return force exerted by the safety linkage mechanism. This can restrict movement of the pusher toward the opposite inner surface of the feed tube. Because contact with the safety rail occurs in the pilot area, friction along the entirety of the length of the safety rail is avoided. Further, concentration of the contact area in the area of the pilot allows for the provision of a relief opening 336 that is exposed to the interior of the feed tube rather than concealed from it by a side wall or partition as is common in the prior art. This exposure to the interior of the feed tube allows for easier cleaning and thus greater hygiene.

Figure 13:
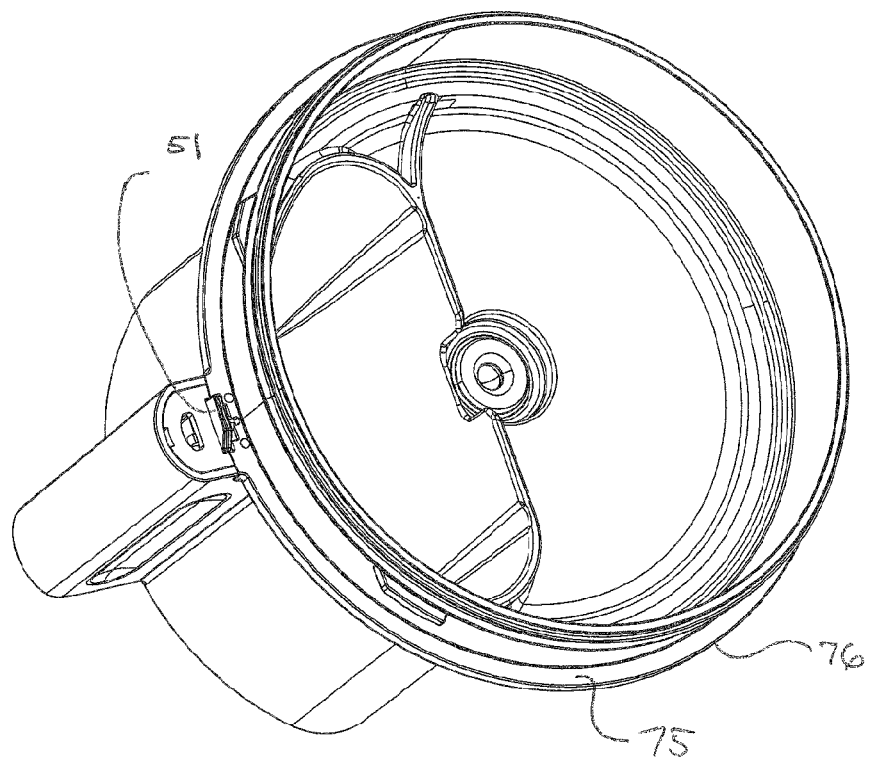
Figure 19:
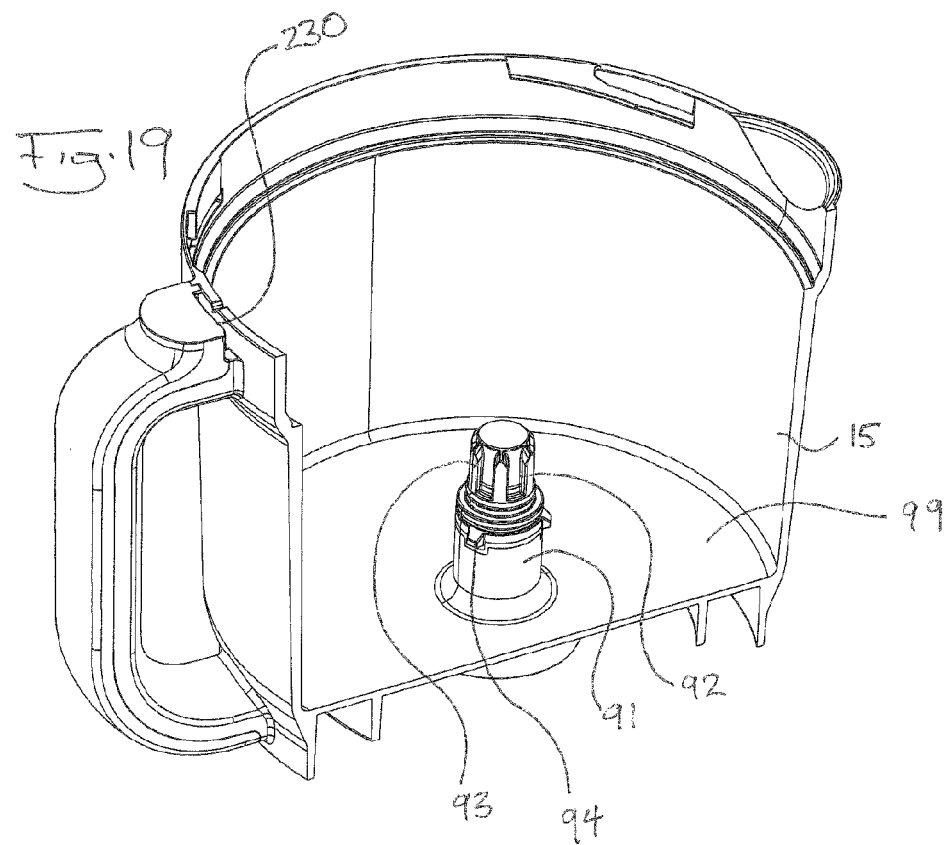

As shown in FIG. 13, the lower tab 51 of the third linkage 48 protrudes from an opening in the lower surface 75 of the lid's flange 76. FIG. 19 also illustrates the groove 230 in the upper part of the handle that admits the actuating tab 56 of the intermediate link.

Figure 17:
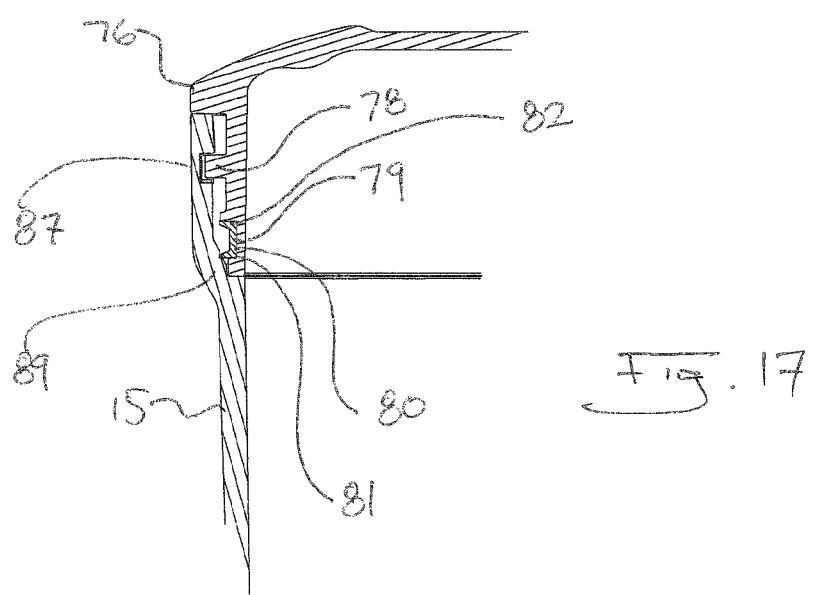

As shown in FIG. 15 through FIG. 17 a fluid barrier or seal 79 extends between the lid 17 and the top of the bowl 15. This seal helps contain liquids. As shown in FIG. 15 and FIG. 17, the lid is characterised by circumferential flange 76 below which extends a generally cylindrical rim 77. The rim 77 further comprises radially extending male bayonet features 78 that are spaced apart from one another around the longitudinally extending rim 77. The lower part of the rim comprises a circumferential rectangular groove into which is located a polymeric seal 79. As suggested by FIG. 15 and FIG. 17, the seal 79 is approximately "C" shaped in cross section. Thus, the seal has a central flat portion 80 and radially extending limbs 81, 82. As suggested by FIG. 17, only the lower bead or limb 81 of the seal 79 actually contacts the interior of the bowl 15. Contact between the seal and the bowl occurs only on the angled contact section 89. This reduces friction when the lid is installed. This is because the inside of the upper rim 89a of the bowl is larger in diameter than the seal 79.

The seal is "C" shaped even though only one bead contacts the interior of the bowl. This is so that the seal functions to provide a relatively soft and flexible point of contact whether it is installed right side up or upside down by a user. Holes 37a in the underside of the linkage housing provide drainage.

As shown in FIG. 16 and FIG. 17 the upper portion of the bowl is configured to receive the lid. As illustrated, the upper rim 83 of the bowl 15 is larger in diameter than the central portion of the body 84. The generally upper cylindrical portion of the bowl between the rim 83 and the central body portion 84 incorporates female bayonet features 85 that adapted to receive and retain the male features 78 found on the rim of the lid. As suggested by FIG. 16, the female bayonet features incorporate a relatively wide mouth 86 and a downward extending ramp 87 into which the male bayonet features travel when the lid is rotated. The downward inclination of the ramps of the female bayonet features causes the lid to be driven downward toward the bottom 88 of the bowl 15. This rotation of the lid urges the lower bead 81 of the seal 79 into contact with a angled contact section 89 that extends between the bowl's cylindrical upper rim area and its body.

Figure 18:
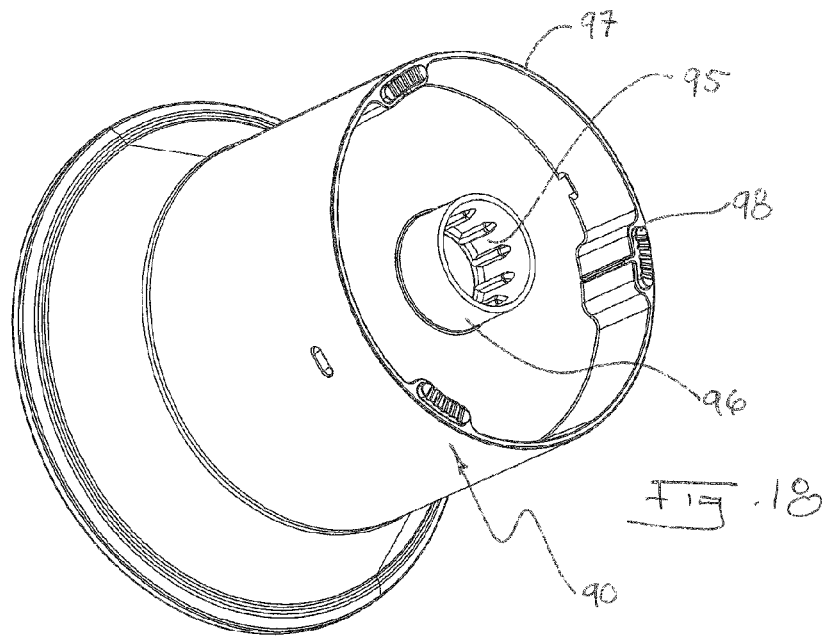
Figure 20:
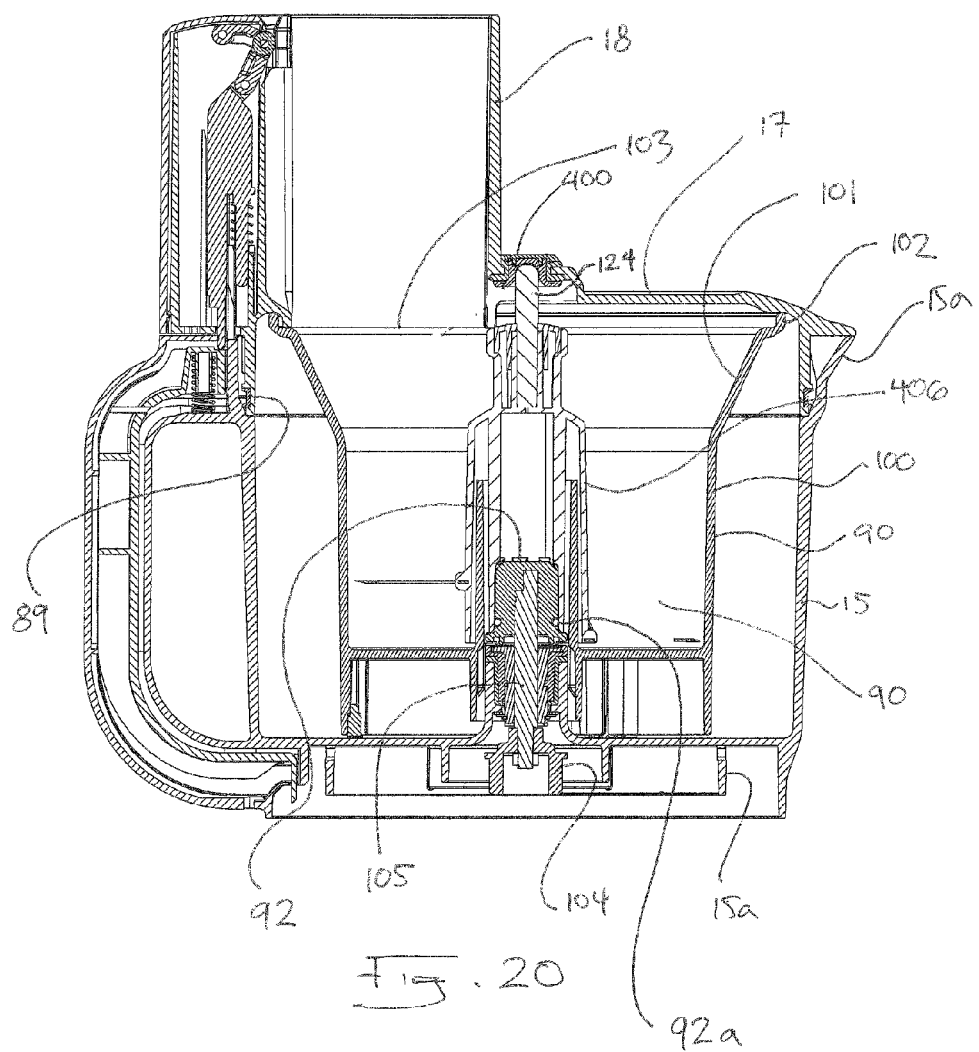

As shown in FIG. 18, FIG. 19 and FIG. 20, the bowl 15 is adapted to receive a smaller, inner bowl 90. With reference to FIG. 19, it can be seen that the main or outer bowl 15 further comprises a centrally located neck 91 through which extends a primary coupling 92. The lower coupling 104 engages with the female coupling component 22 (see FIG. 2) and presents (above the neck 91) a male coupling component 93. The male coupling component 93 sealed with respect to the neck 91 and will rotate in unison with the female coupling component when the bowl 15 is installed on the base. The neck 91 includes one or more (three in this example) radial projections 94 that engage with an internal spline 95 formed in the alignment neck 96 of the inner bowl 90. As shown in FIG. 18, the lower edge 97 of the inner bowl further comprises an array of polymeric feet 98 that prevent the lower edge of the inner bowl from contacting and therefore scuffing the inner floor 99 of the bowl 15. An "O" ring 92a in a groove on the coupling retains the blade when the apparatus is tipped for pouring.

As shown in FIG. 20, the generally cylindrical body 100 of the inner bowl 90 extends upwardly to a truncated conical section or conical flare 101 having an upper rim 102. As shown in FIG. 20, the diameter of the rim 102 is sufficient to contain within the open mouth defined by the rim, the output opening 103 of the feed tube 18. The flare allows food to fall into the generally cylindrical body 100 and toward the blades. It will be appreciated that food elements are typically expelled by the blades onto the side walls of the generally cylindrical body. The upright, or substantially vertical, side walls encourage the food element to call back toward the blades.

In preferred embodiments, the rim 102 extends to the underside of the lid 17. The close tolerance is accommodated by the feet 98. FIG. 20 also illustrates the second male coupling component 104 that is attached by a shaft 105 to the male coupling component 92 located within the bowl 15. Thus, the inner bowl allows a smaller diameter blade 106 to be used in conjunction with a smaller volume bowl 90 and still take advantage of the full cross sectional area of the feed tube 18. The vertical sides of the bowl allow food to drop more freely onto the blades. This view also shows that the bowl's pouring spout 15a is above the level of the seal 79.

As shown in FIG. 20, FIG. 21A and FIG. 20B, the tip 124 of a spindle or cutting blade may be retained and stabilised by a lid mounted bushing assembly 400. As shown in FIG. 20A and FIG. 20B, the assembly 400 comprises a softer elastomeric vibration damping insert 401, an acetal polymer bushing 402, an acetal cap 403 and a circular weld wire 404. The polymeric insert 401 has a central opening 405 that is flanked by, for example, a pair of location slots 407, 408. The insert 401 also has a circumferential groove 409 within which groove is located a pair of projections 410. The circumferential groove 409 receives a rim 411 of an opening formed on the upper surface of a small dome 412 formed in the lid on the rotational centre line of the spindle or blade. The rim 411 features a pair of opposing recesses 412. The protrusions 410 fit into the recesses 412. The acetal journal 402 has a central hub 413 having opposing ears 414. The hub fits into the opening 405 of the insert and the ears 411 fit into the opposing slots 408. Thus, the ears 414 protrude into the openings 412 and prevent both the journal 402 and the insert 401 from rotating. Using a circular weld wire 404, the acetal cap 403 is welded to the journal 402. As shown better in FIG. 20B, the journal 401 has an upward facing groove 420 adapted to receive the circular weld wire 404 and a descending cylindrical ridge 421 formed on an underside of the cap 403. It can also be seen in 20B that the insert and cap are not fully symmetrical, being reduced in effective radius on one side to allow the proximal flat side of the feed tube 18 to be located as close as possible to the centre of the rotation. This features allows the full effective length of a cutting blade to be utilised.

Figure 21:
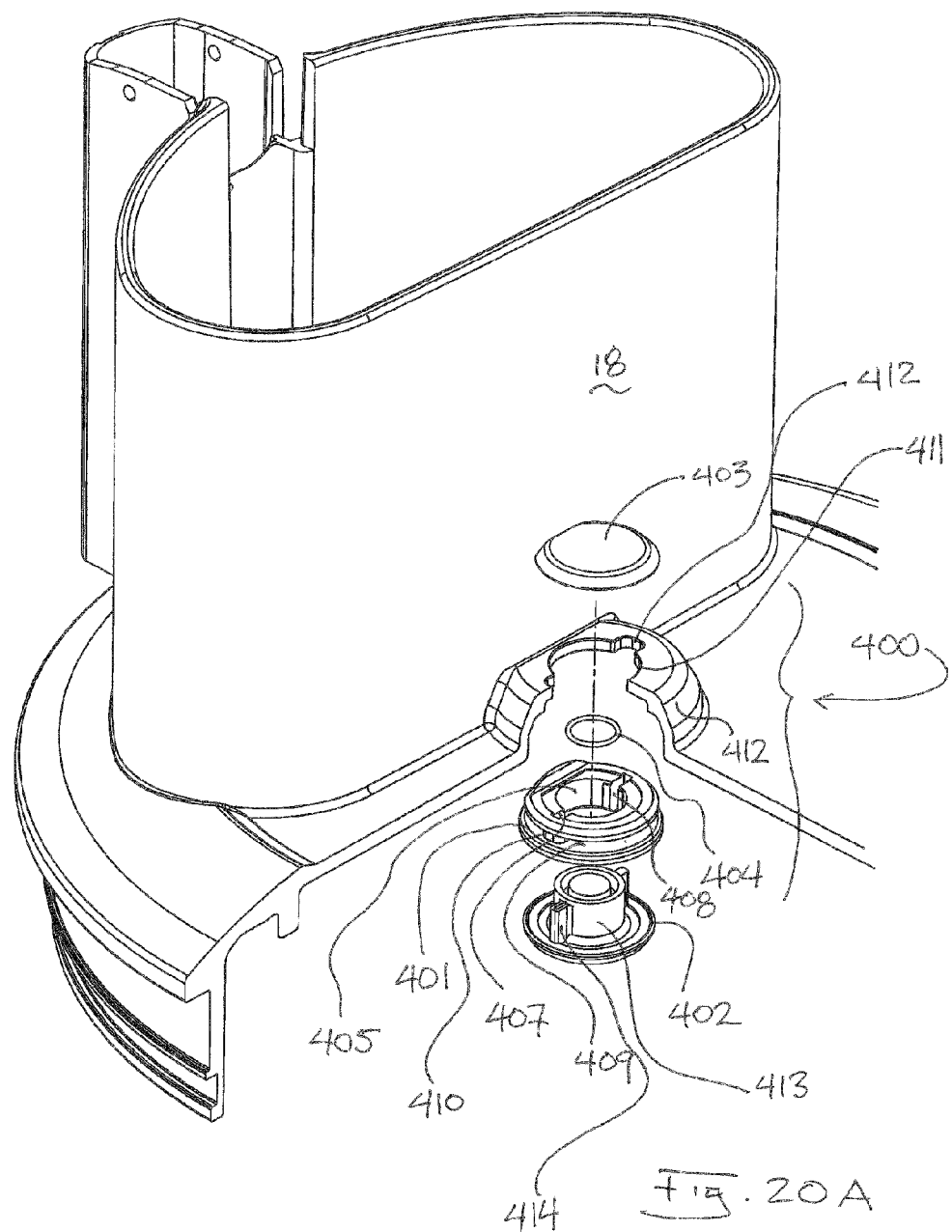
Figure 22:
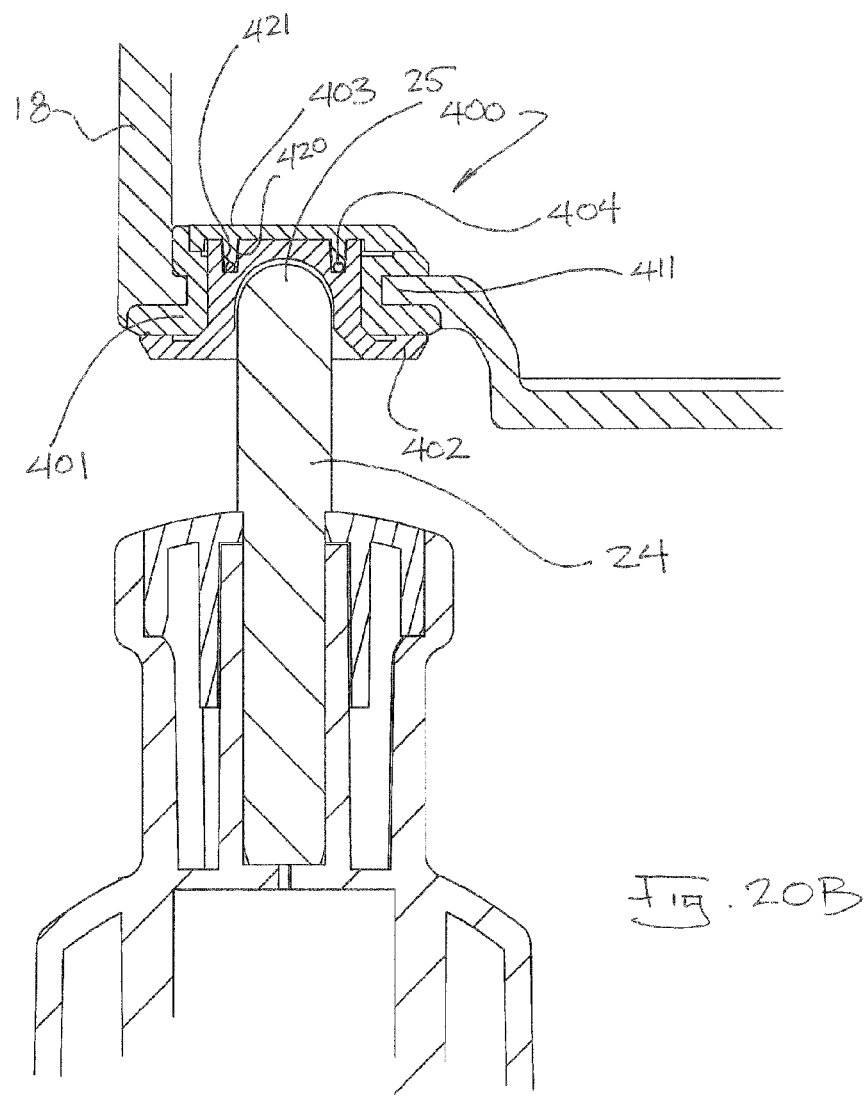
Figure 23:
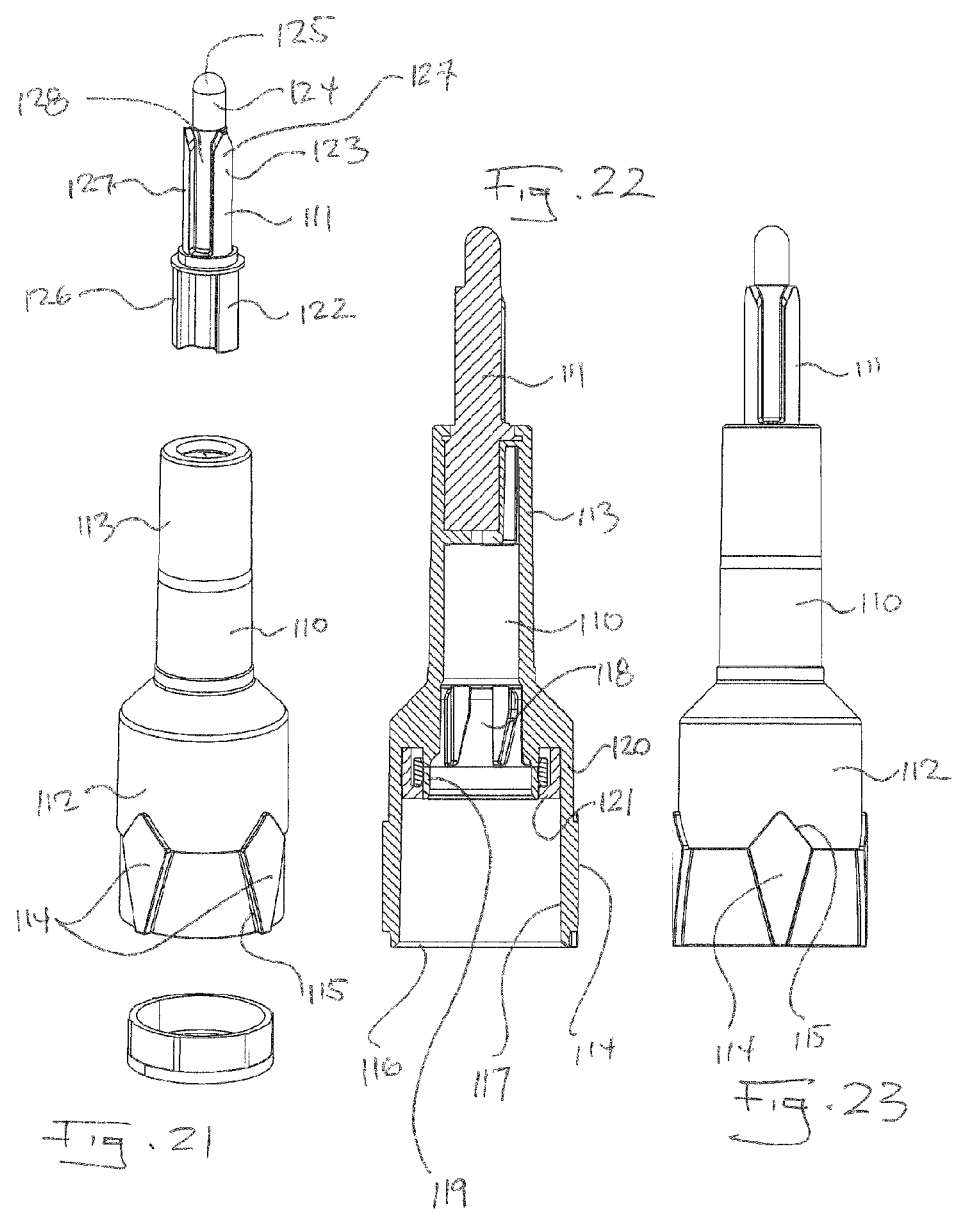

A spindle for the food processor of the present invention is shown in FIG. 21 through FIG. 23. As shown in FIG. 21, the spindle comprises an elongated polymeric body into which is moulded or inserted, a sintered or machined stainless steel tip 111. The body comprises a lower portion 112 having a larger diameter than an upper portion 113. The lower part of the larger diameter portion 112 is characterised by an array of equally spaced, low relief projections 114. The projections 114 are adapted to engage cooperating features located within the bore of each of the cooperating sleeves that are associated with some of the food processor blades and tools. Each projection 114 presents flat, angled faces 115 that are adapted to engage cooperating faces within the appropriate tools, regardless of the direction of rotation. The spindle has a lower opening 116 that is adapted to receive the bowl's male coupling component 92. However, the inside diameter of the lower portion 117 is large enough to avoid the anti-rotation projections 94 found on the exterior of the sleeve 91. The enlarged diameter portion 117 leads to internal splines that are adapted to engage with a pilot onto the male coupling component 92. A thin walled pilot section 119 leads from the enlarged diameter portion 117 into the internal splines 118. The small circumferential cavity between the pilot section 119 and the outer wall 120 of the spindle is filled with a gland 121 that prevents debris or food from becoming lodged within the interior of the spindle.

The sintered and machined stainless steel tip 111 further comprises a base 122, a spline section 123 and a tip 124 with a rounded extremity 125. The base 122 has, in this example, three longitudinal ribs 126 that are adapted to transmit high levels of torque to the upper section 113 of the spindle. The spline section 123 has a close tolerance, machined, cylindrical exterior 127 that is interrupted by a number of longitudinal channels 128. The machined exterior surfaces of each of the splines 127 assist in aligning, centring and snugly retaining the couplings of the accessory discs that are used in conjunction with the spindle. The rounded tip 125 cooperates with the journal 107 (see FIG. 20).

Figure 24:
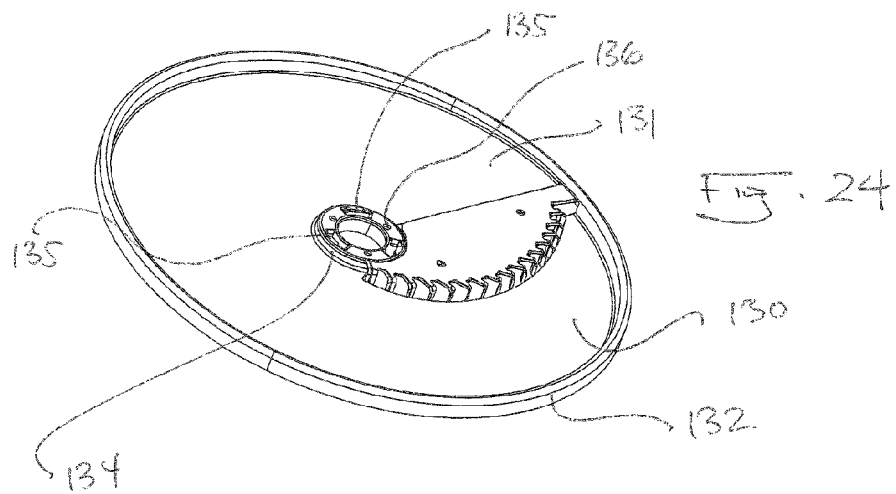
Figure 25:
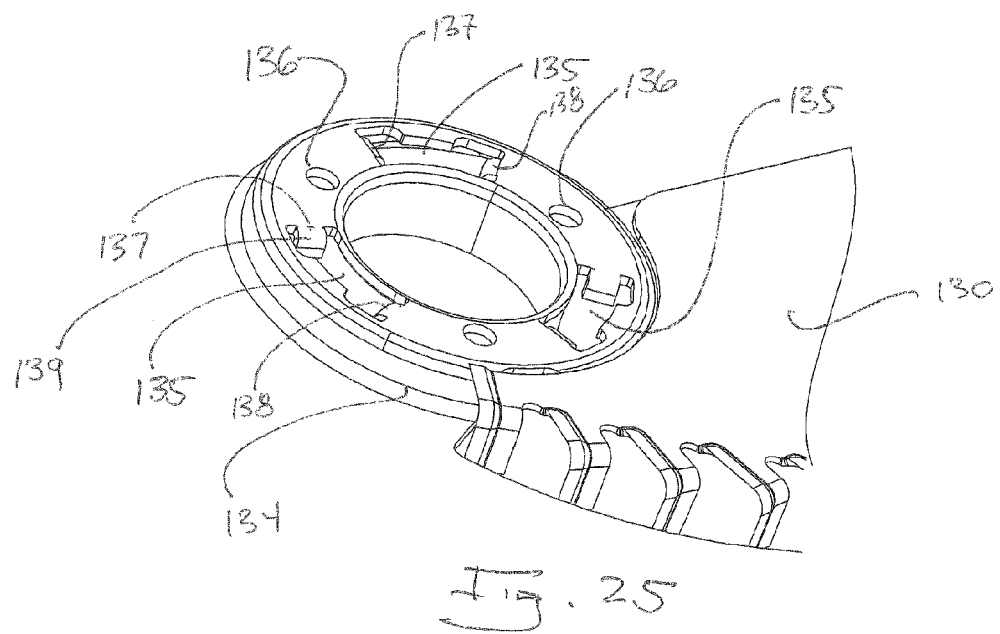
Figure 26:
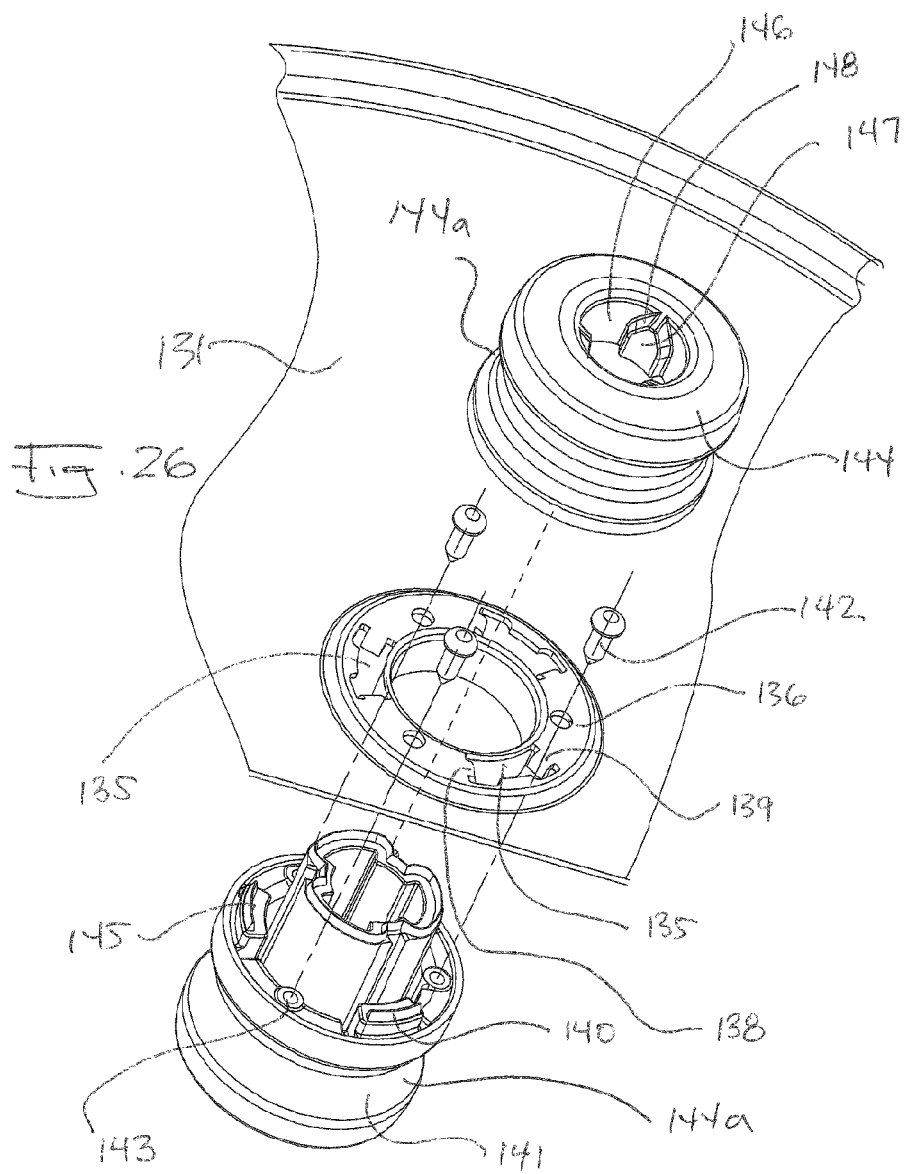

A representative cutting disc and its mounting hub are illustrated in FIG. 24 through FIG. 26. As shown in FIG. 24 a julienne blade or accessory comprises a stainless steel disc 131 having a circumferential ridgidising rim 132. A central part of the blade comprises an integral drive flange 134. The drive flange 134, as shown in FIG. 25, comprises three drive openings 135 and three fastener openings 136. As suggested by FIG. 25 and FIG. 26, the drive openings 135 further include downward facing tabs 137, 138. The tabs 137, 138 are press formed then bent downward so as to create vertical faces. These vertical faces 139 are adapted to contact an array of raised bosses 140 that are located on an upper surface of a coupling half 141. As shown in FIG. 26, one half of the tool's coupling is located below the stainless steel disc 131. Fasteners 142 extend through the fastener openings and into receiving openings 143 located in the lower coupling half 141. With the bosses 140 located in the drive openings 135 and the fasteners 142 inserted through the fastener openings and into the lower coupling half, the upper coupling half 144 can be accurately positioned over the drive flange and ultrasonically welded onto the lower coupling half 141, assisted in the positioning of there by arcuate ridges or weld beads 145 formed on the upper surfaces of the bosses 140. The top coupling half conceals the fasteners 142. When joined together, the upper and lower coupling halves 141, 144 cooperate to form a splined internal bore 146. Each of the raised longitudinal splines 147 is tapered at each end 148 to pilot and facilitate insertion onto the sintered stainless steel splines of the spindle. The cooperation between the tightly controlled dimensions of the internal spline and the machine turned tip diameter of the spindle's splines creates a snug sliding fit that contributes to the stability and freedom from vibration and unwanted movement that characterises these components. Each coupling half has an undercut groove 144a to assist in removal.

Figure 27:
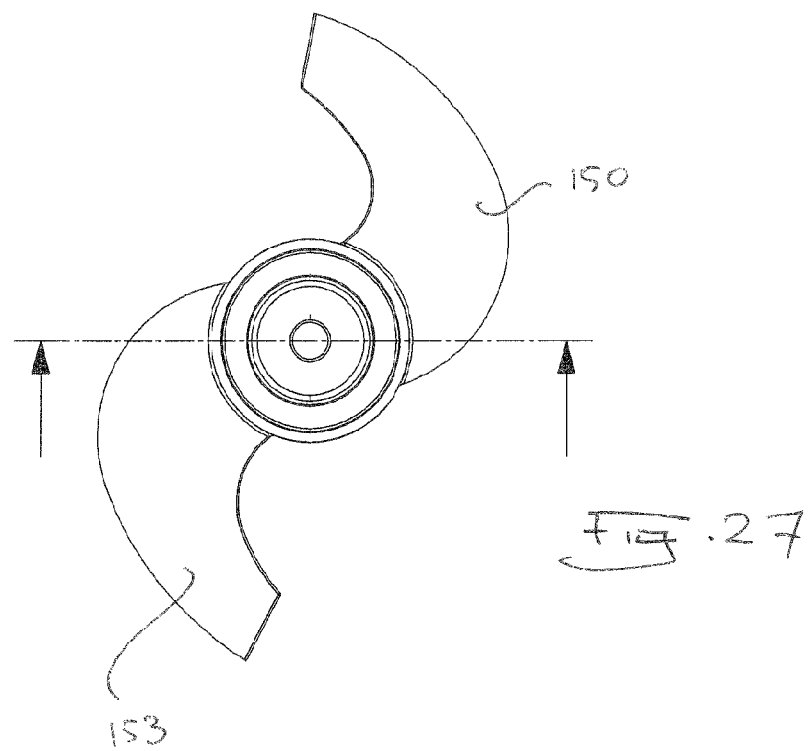
Figure 28:
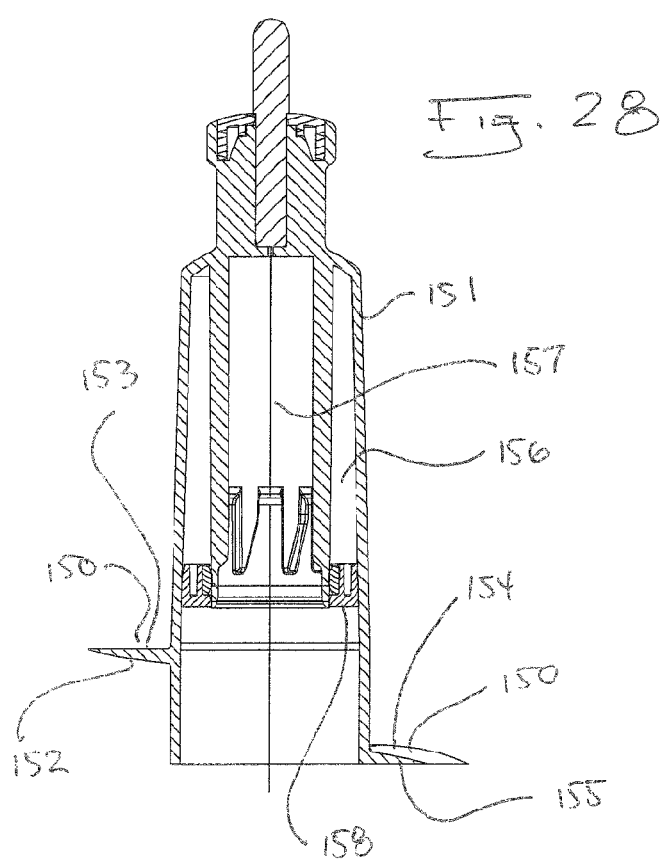

A dough making blade is shown in FIG. 27 and FIG. 28. The dough making blade comprises a pair of polymeric, arcuate blade portions 150 that are integrally moulded onto a spindle body 151. The two blades are located 180 degrees from one another. The upper blade has a curved lower surface 152 and a flat upper surface 153. The lower blade has a curved upper surface 154 and a flat lower surface 155. A circumferential cavity 156 extends around the main bore 157. The opening of the circumferential cavity 156 is sealed by a polymeric gland 158.

Figure 29:
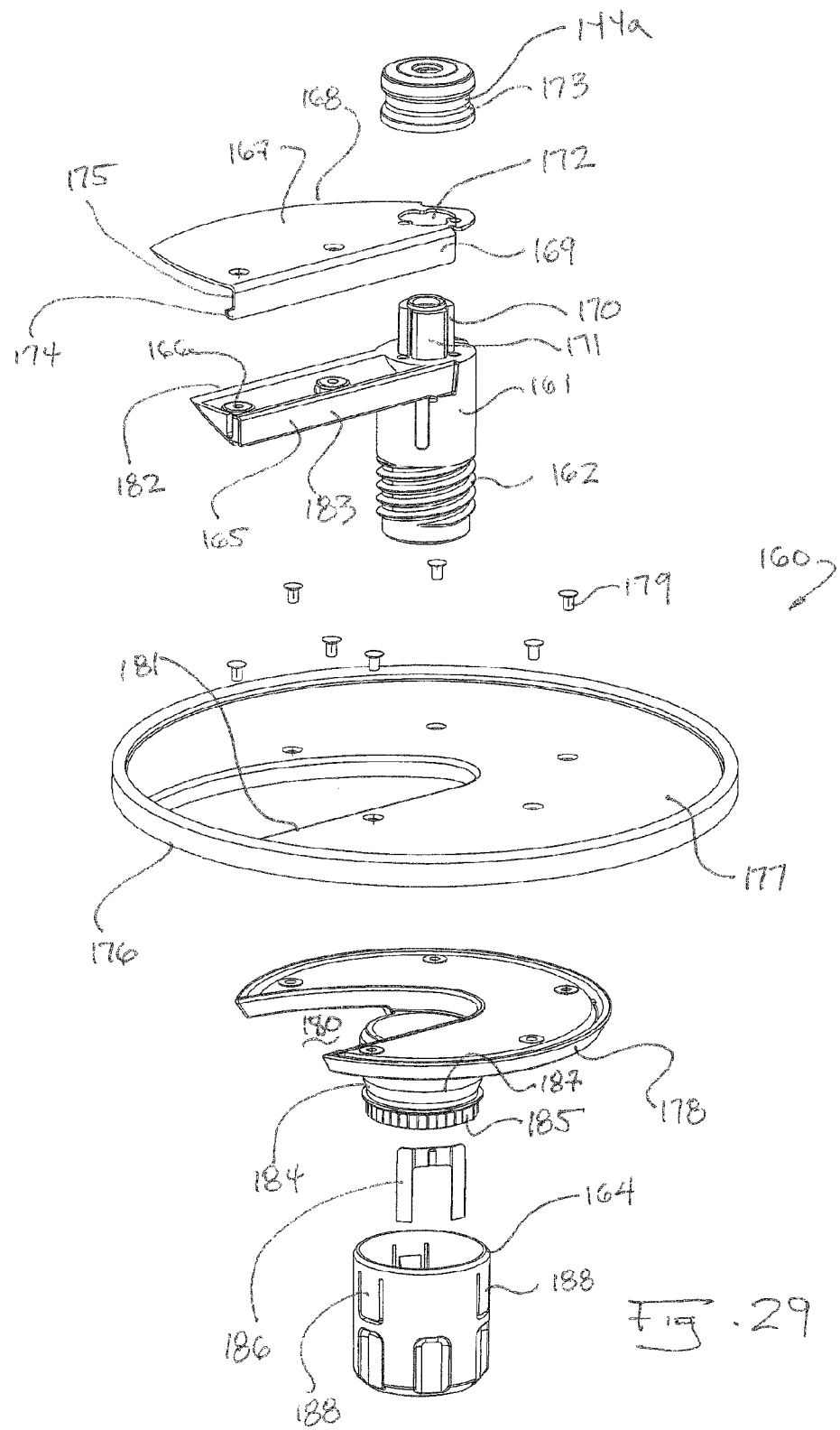
Figure 30:
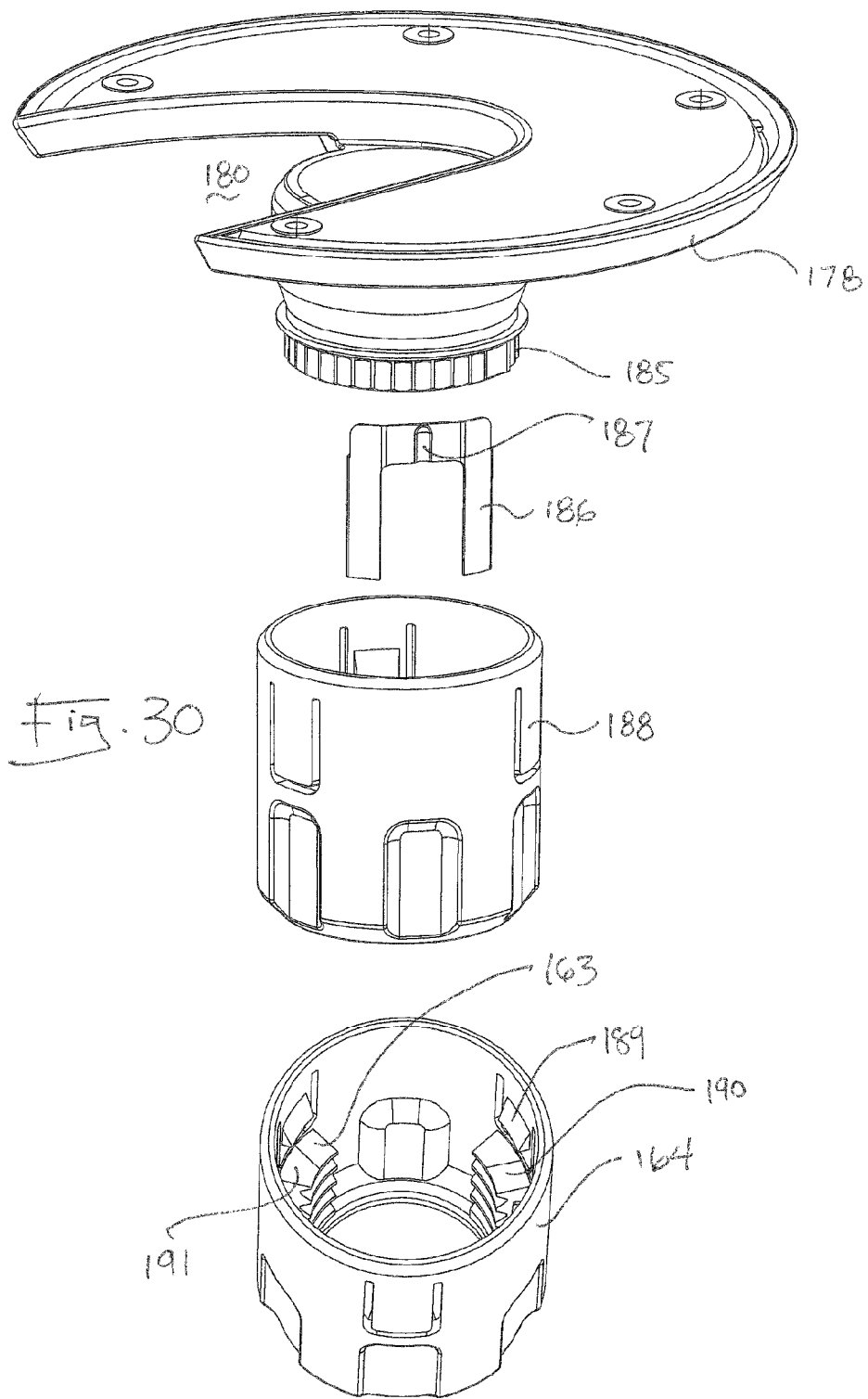
Figure 31:
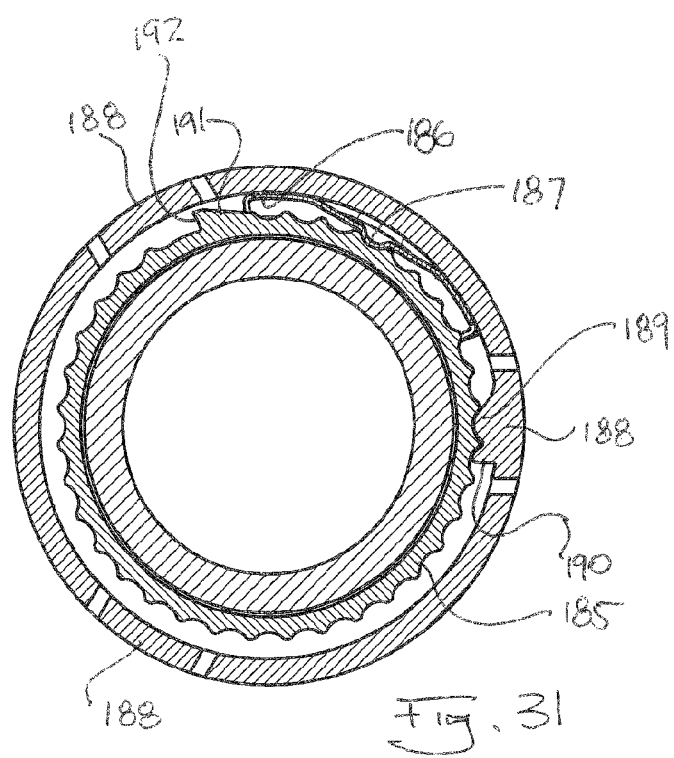

An adjustable thickness cutting blade is depicted in FIG. 29 through FIG. 31. The adjustable thickness blade 160 comprises a central hub 161. The hub 161 has three external coextensive threads 162 for receiving three separate internal thread segments 163 located within an adjustment sleeve 164 (see FIG. 30). The hub 161 further comprises an integral cantilever or blade support 165 having openings 166 adapted to receive rivets that are used to retain the cutting blade 167 onto the cantilever 165. The front edge 182 of the cantilever is thinner than the trailing edge 183 of the cantilever. The metal blade 167 has an arcuate cutting edge 168 and an alignment backstop 169 formed at a right angle to the upper surface of the blade 167 to rigidise it. The internal bore of the hub 161 has splines that cooperate with the splines of the spindle. An upper reduced diameter extension 179 of the hub comprises an array of longitudinal splines or ribs 171. An opening 172 in the blade 167 cooperates with and engages the ribs 171 so that torque forces imposed on the blade are transmitted to the hub. The blade is sandwiched between the hub and an upper coupling half 173 that is ultrasonically welded to the hub 161. The ridgidising backstop 169 further comprises a tab or stop 174 that extends radially outward beyond the terminal edge 175 of the blade. The stop 174 is adapted to abut the underside of the rim 176 of the blade's stainless steel disc 177 so as to limit the downward movement of the discs 177 relative to the blade 176. It should be noted that the disc 177 and the mounting flange 178 could be moulded together as one polymeric component.

The disc 177 is affixed to a polymeric mounting flange 178 with rivets 179. The flange 178 further comprises a recess 180 that cooperates with a similarly shaped opening 181 in the disc 177, that opening 181 receiving the blade 167 and its cantilever 165. The flange 178 further comprises a collar 184. A lower extent of the collar is moulded to form an array of evenly spaced longitudinal ridges 185 that form scallops betweens each ridge. The array of ridges 185 cooperate with a thin steel insert 186 that is retained within the adjustment collar 164 (see FIG. 31). The flange's collar 184 also comprises a circumferential bead 187. The bead 187 cooperates with flexible locking or anti-removal tabs 188 formed into the wall of the adjustment collar 164.

As suggested by FIG. 29 through FIG. 31, the cutting blade 167 is carried by the hub 161 and the disc 177 is carried by the flange 178. Thus, the axial adjustment between the blade and the disc 177 can be controlled by rotation of the adjustment sleeve 164 relative to the hub's threads 162. When installed at the factory, the adjustment sleeve 188 is fully screwed onto the threads 162 so that the integral ramps 189 associated with the cantilevered flexible tabs 188 ride over the bead 187 located around the flange's collar 184. The ramped teeth 189 thus flex and resist slightly when going over the bead 187 but prevent the withdrawal of the adjustment sleeve 164 from the hub 161. The steel insert 186 locates between adjacent thread sections 190, 191 internal to the sleeve 164. As shown in FIG. 31, the insert 186 presents an inwardly directed hump 187 that is adapted to engage the ridges 185 formed on the exterior of the flange. The hump 187 enhances the engagement and the tactile feel of the operation of the adjustment sleeve 164. One of the tabs 188 further comprises a second hump 189 and a rotation limit stop 190 adapted to ride over a ramp 191 formed in the area of the ridges 185 and rotated in one direction but abut a flat surface 192 of the ramp when rotated in the opposite direction.

Figure 3:
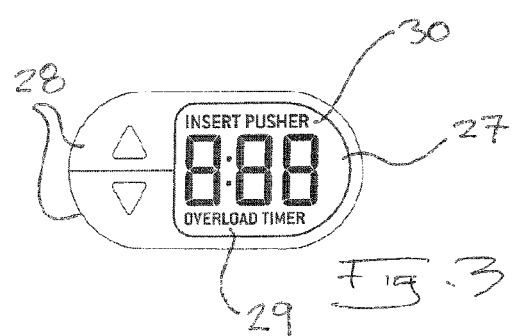

A whisking disc accessory 200 is depicted in FIG. 32 through FIG. 34. As suggested by 32 and 34, the disc accessory is removably carried by a spindle 201. The working portion of the disc 202 comprises a generally circular disc having concentric undulations 203. The underside 204 of the disc is characterised by a pair of opposing fins 205. The edge of the disc 202 further comprises a pair of downwardly extending ramped portions 206 that are partially separated 207 from the body of the disc 202. As seen in FIG. 34, the ramps 206 extends slightly below the flat underside 204 of the disc. As shown in FIG. 3 the internal bore 208 of the integral hub 209 of the disc comprises internal raised features 210 with surfaces 211 that cooperate with the drive features found on the lower extremity of the spindle 114 (see FIG. 23). Because the ramped surface presents cooperating, angled drive faces in both directions on both the hub and spindle, the hub is retained and urged downward in both directions of rotation.

Figure 35:
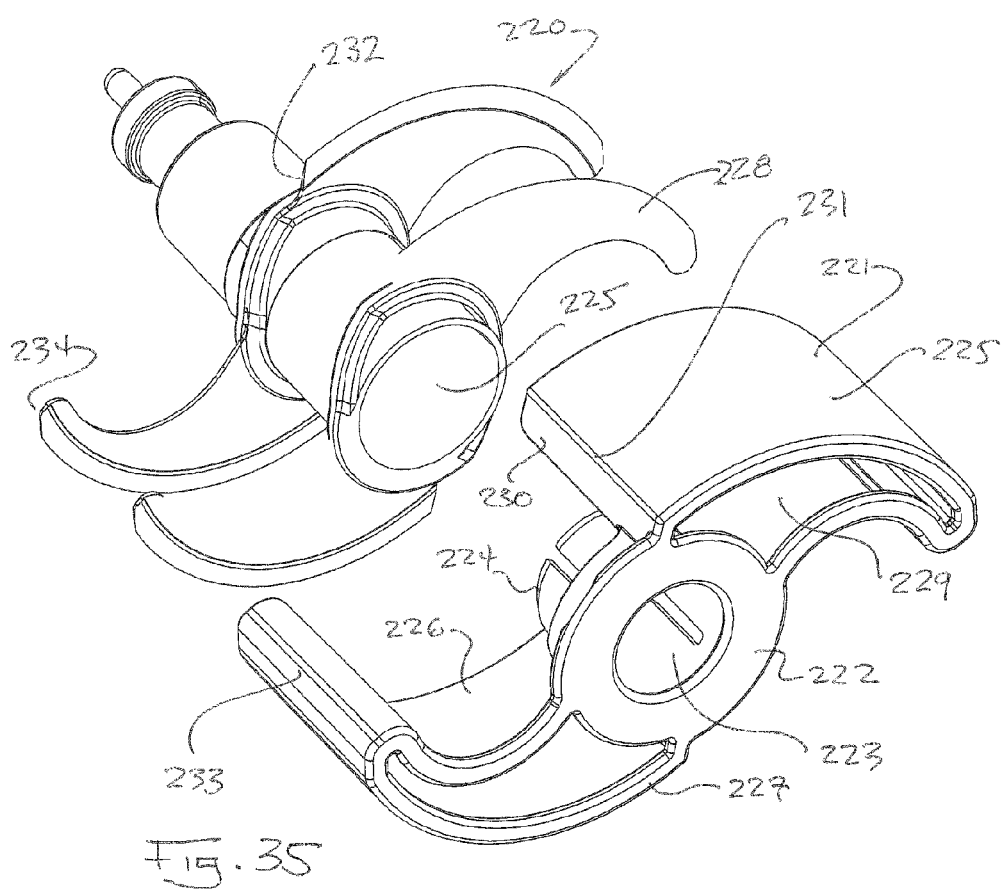
FIG. 35 is a perspective view of four bladed accessory and its dishwasher cover.

As shown in FIG. 35, a four bladed cutting accessory 220 may be provided with a moulded polymeric cover 221. The cover 221 is used to protect the blades of the accessory 220 but also to facilitate loading and unloading of the accessory 220 into, for example, a dishwasher. The cover 221 comprises a central hub 222 having a central opening 223. A segmented collar 224 extends away from the hub and is adapted to engage the internal bore 225 of the accessory 220. Arcuate walls 225, 226 extend away from the base 227 of the cover. The base is shaped to conform to the shape of the blades 228. The base may incorporate openings 229 to facilitate the movement of water into and out of the cover. One end 230 of each arcuate wall joins the wall at a corner 231 and serves to cover a radially inward 232 portion of each pair of vertically stacked blades. The other end 233 of each wall is curved so as to contain and protect the tips 234 of the blades.

Figure 36:
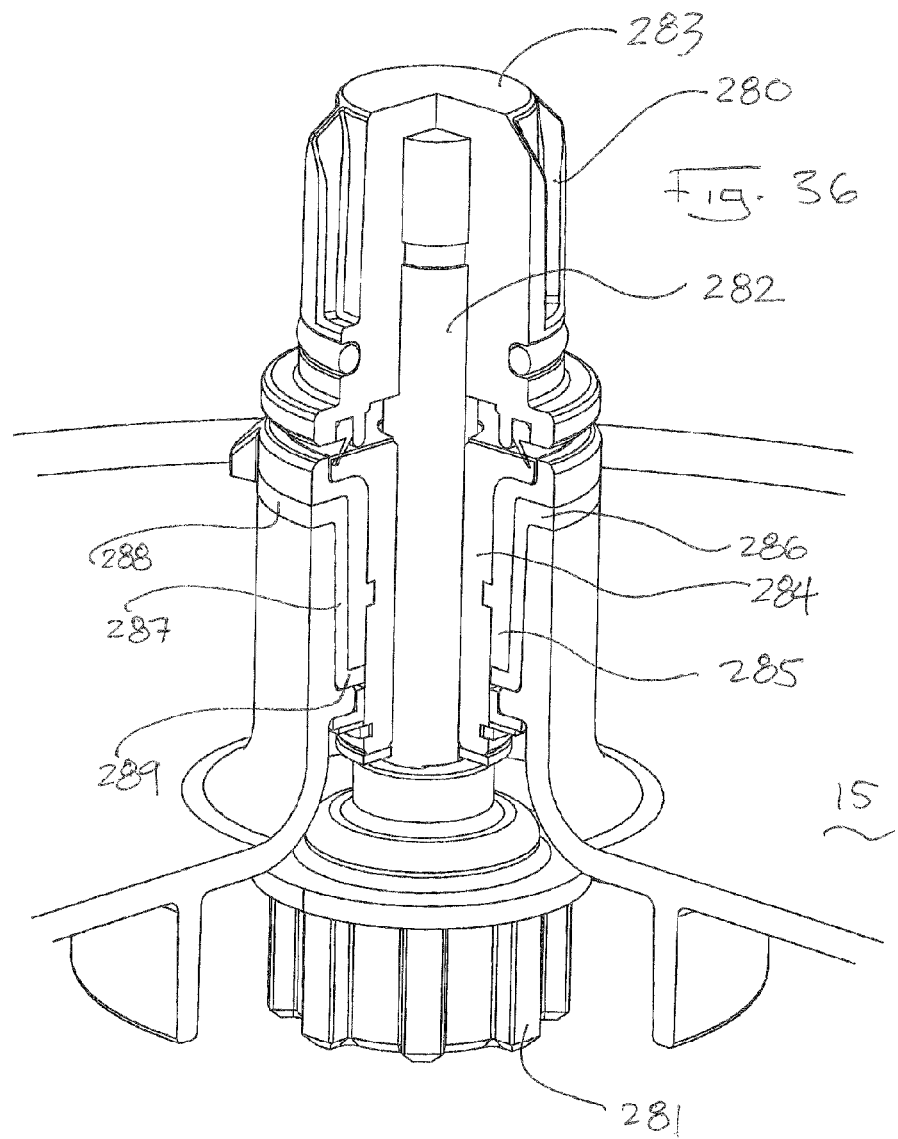
FIG. 36 is a cross sectional view of the primary coupling that extends between the underside and the interior of the food processor's main bowl.

As shown in FIG. 36 a double ended drive coupling assembly 280 extends through the floor of the bowl 15. The coupling comprises a lower male coupling component 281 that engages the base's female coupling component 23. The lower component 281 is attached to a steel shaft 282. An upper male coupling component 283 is affixed to an upper end of the shaft 282. Between the two male halves 281, 283 a sintered bush 284 is carried by the shaft 282. The sintered bush 284 is insert moulded into a nylon (or other polymer) bushing sleeve 285. The assembled coupling halves 281, 283 shaft 282, bush 284 and bushing sleeve 285 are then inserted into a soft polymeric or rubber boot 286. The rubber boot has a cylindrical or slightly tapered body 287, an upper and outwardly directed flange 288 and a floor or terminal end 289 with an opening in it for receiving the sintered bush. The rubber boot reduces vibration and assists in reducing temperature transfer to the bowl when the bush heats up from use. The boot 287 is carried within the central neck 91 of the bowl (see FIG. 19). Apart from the novel polymeric boot 286, other aspects of this coupling are conventional. The rubber boot is particularly effective in combination with the vibration dampening cap on the lid that locates and restrains the metallic top of the spindles disclosed above.

Figure 37:
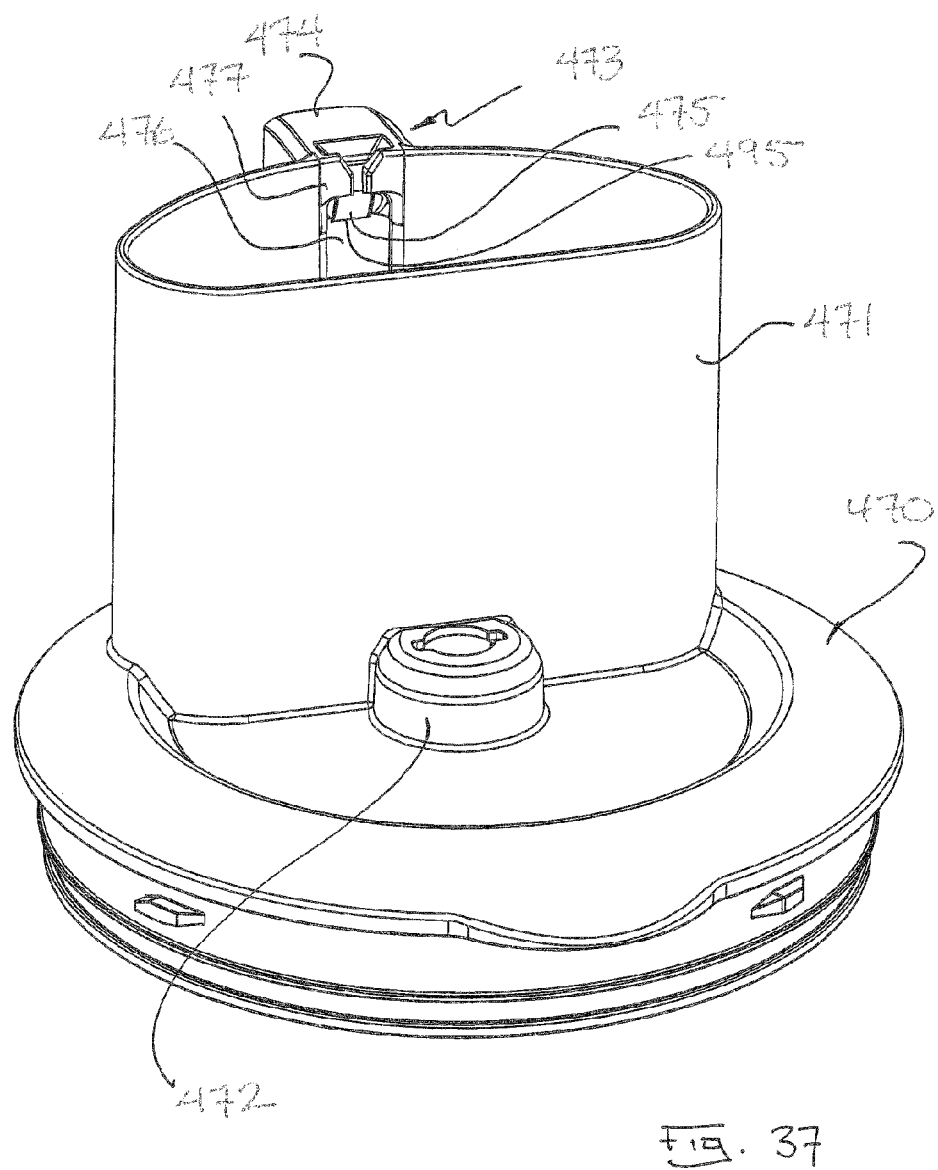
FIG. 37 is a perspective view of a lid with integral wide feed tube.

As shown in FIG. 37, a lid 470 is provided with an integral feed tube 471, bushing-like spindle stabiliser 472 and a safety mechanism 473. The safety mechanism 473 is, in accordance with previously disclosed embodiments, protected by an exterior housing 474, but has a tip or nose 475 that extends through an opening into a longitudinal channel 476 that is adapted to receive the safety rail of a pusher. As with previous embodiments, the upper portion of the channel 476 is defined by a pilot opening comprising a neck 477 and an upward forming and optional lower "V" shaped relief area for cooperating with the safety rail and guiding it during insertion.

Figure 38:
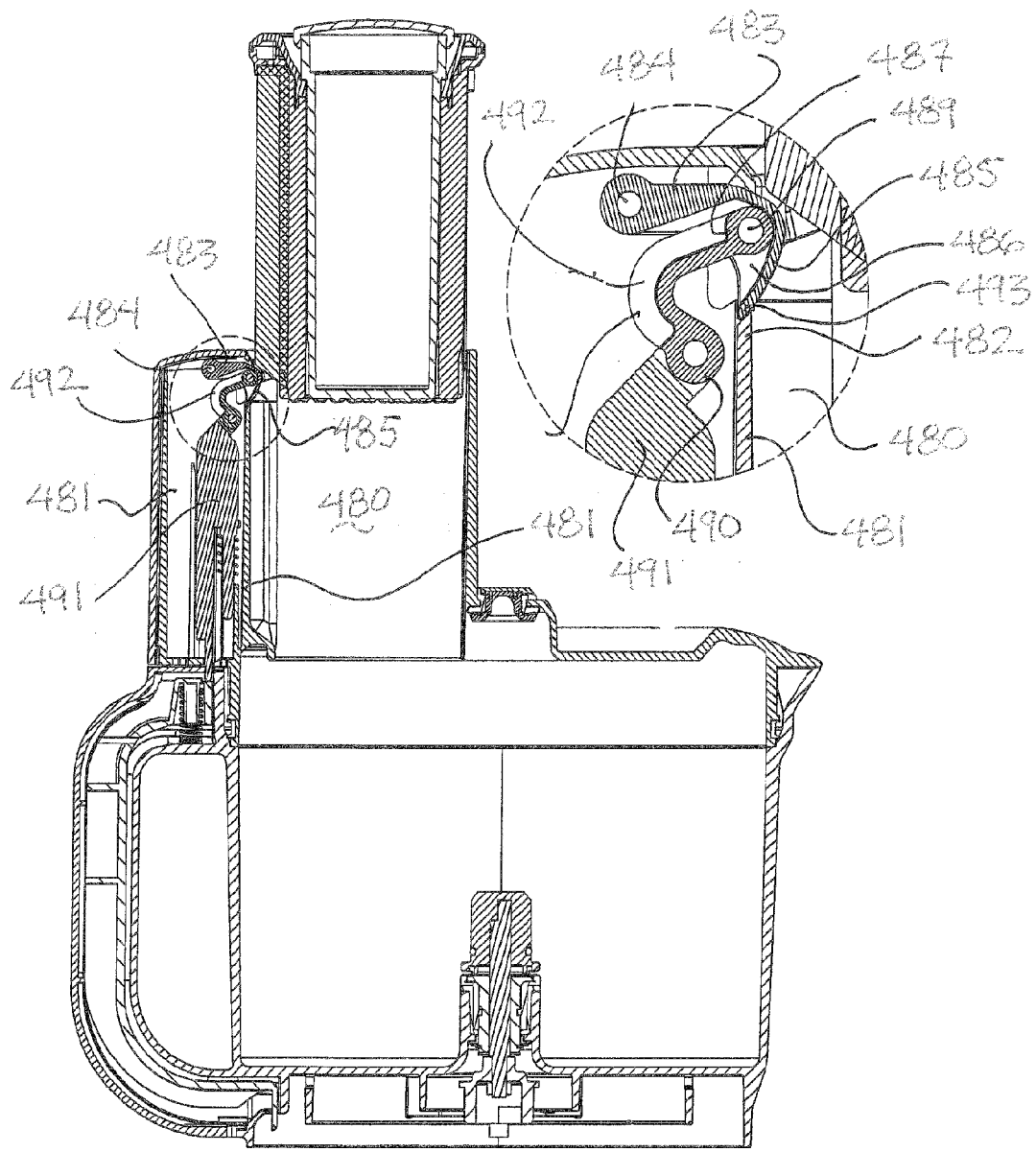
FIG. 38 is a cross sectional view of a bowl, lid, feed tube and safety mechanism.

As shown in FIG. 38, the internal volume of the feed tube 480 is separated from the internal volume of the safety mechanism housing area 481 by a polymer web that is part of the feed tube moulding 481. The upper extent 482 of this web defines, in part, an opening through which extends the nose of the upper link 483. The upper link 483 pivots around a preferably metallic pivot pin 484. The portion of the upper link 483 that extends into the channel 480 is generally "U" shaped in cross section 485, and in this embodiment has side walls 486 that define a cup. Pivoting within the interior of the cup defined by the side walls 486 and the "U" shaped part 485 is the upper extent 487 of a pivoting and intermediate link 488. The intermediate link 488 pivots about a preferably metallic pivot pin 489 that extends from one side wall to the other side wall 486 of the upper link 483. The lower extent 490 of the intermediate link 488 is pivoted to the upper portion of the lower link 491. The lower link 491 of the safety mechanism works the same way as the lower link 48, as described (for example) with respect to FIG. 6, FIG. 7 and FIG. 8. The middle portion of the intermediate link 492 is bent, forming an elbow that is adapted to receive the tip 493 of the upper link 483 when it pivots during the downward motion of the safety rail. In this way, the opening through which the upper link 483 protrudes is largely obstructed by the nose of the upper link 375 when the pusher is removed from the feed tube. This prevents excessive amounts of debris from entering into the internal volume of the safety mechanism 481.

Figure 39:
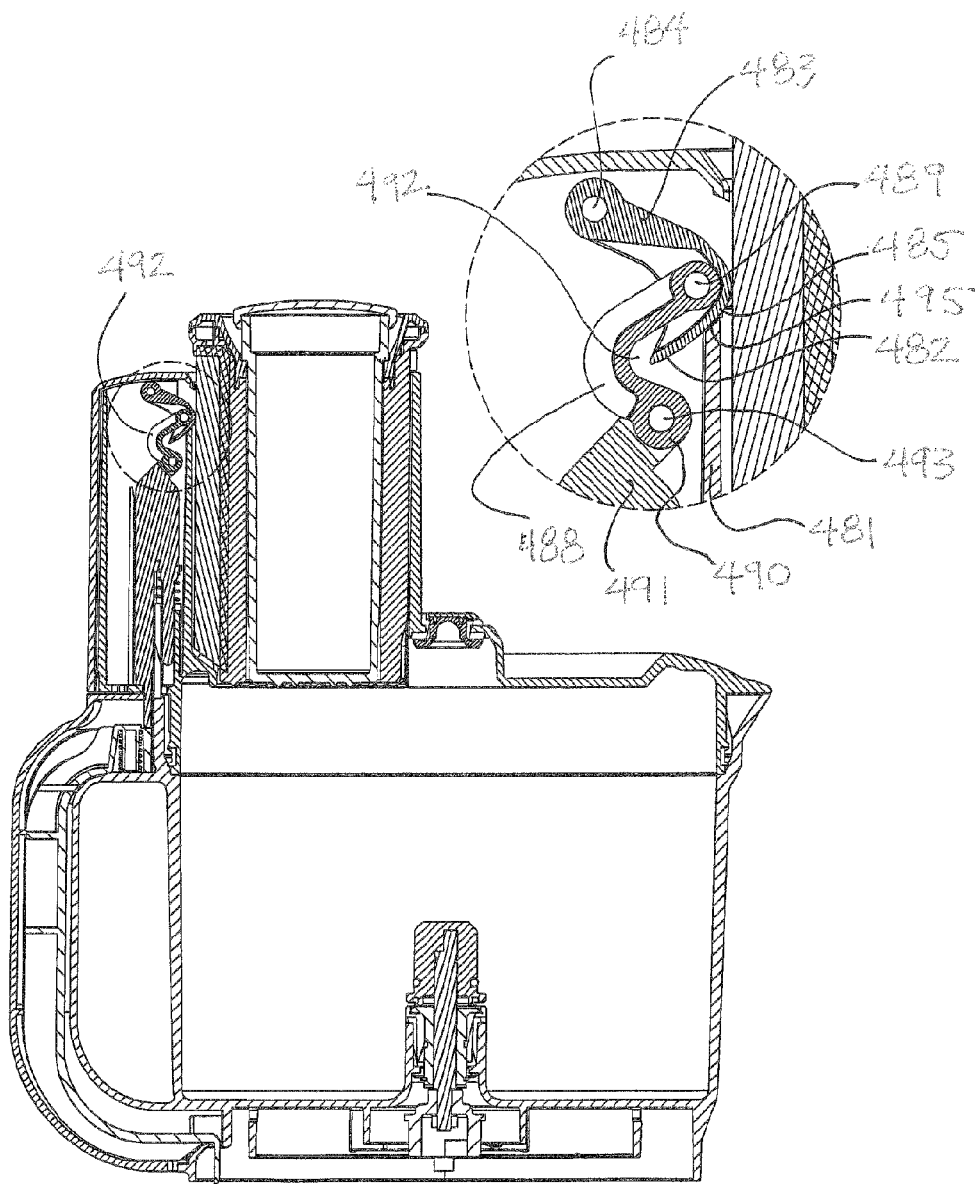
FIG. 39 is another cross section of a bowl, lid, feed tube and safety mechanism.

FIG. 39 illustrates how the bend of elbow 492 in the intermediate link 483 receives the tip 482 of the upper linkage 483. Although the intermediate link 488 is pivoted at both ends 489, 493, the motion of the lower link 491 is always vertical because it is restrained in the way previously described (see FIG. 6 through FIG. 8). The lower link is biased upward by a spring.

Figure 40:
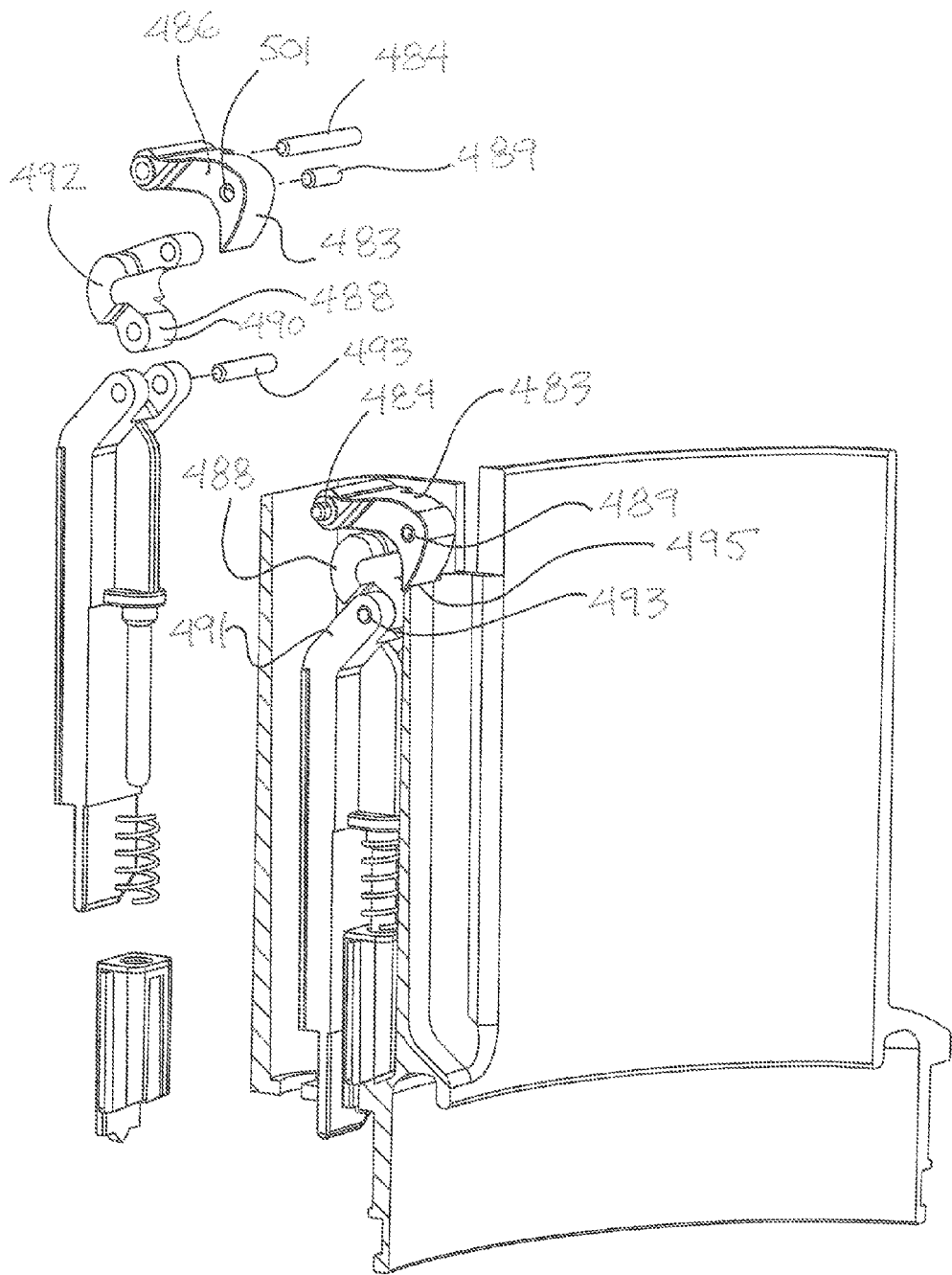
FIG. 40 is a cross sectioned and partially exploded perspective view of a linkage arrangement in a safety mechanism.

As shown in FIG. 40, the lower edge 495 of the opening through which the upper link 483 extends is chamfered so as to cooperate with the outer surface of the nose 375. This minimises the clearance between the outer surface of the upper link and the lower edge 495 of the opening. FIG. 40 also illustrates the trough or cup shape of the upper link 483 and the openings 501 in the side walls 486 for receiving the pivot pit 489 that connects the upper link 483 with the intermediate link 488. The intermediate link 488 is further seen as having the middle portion or bend area 492 being wider than the upper or lower extremities of that link 487, 490. This provides additional strength or rigidity in the elbow or bent portion.

Figure 41:
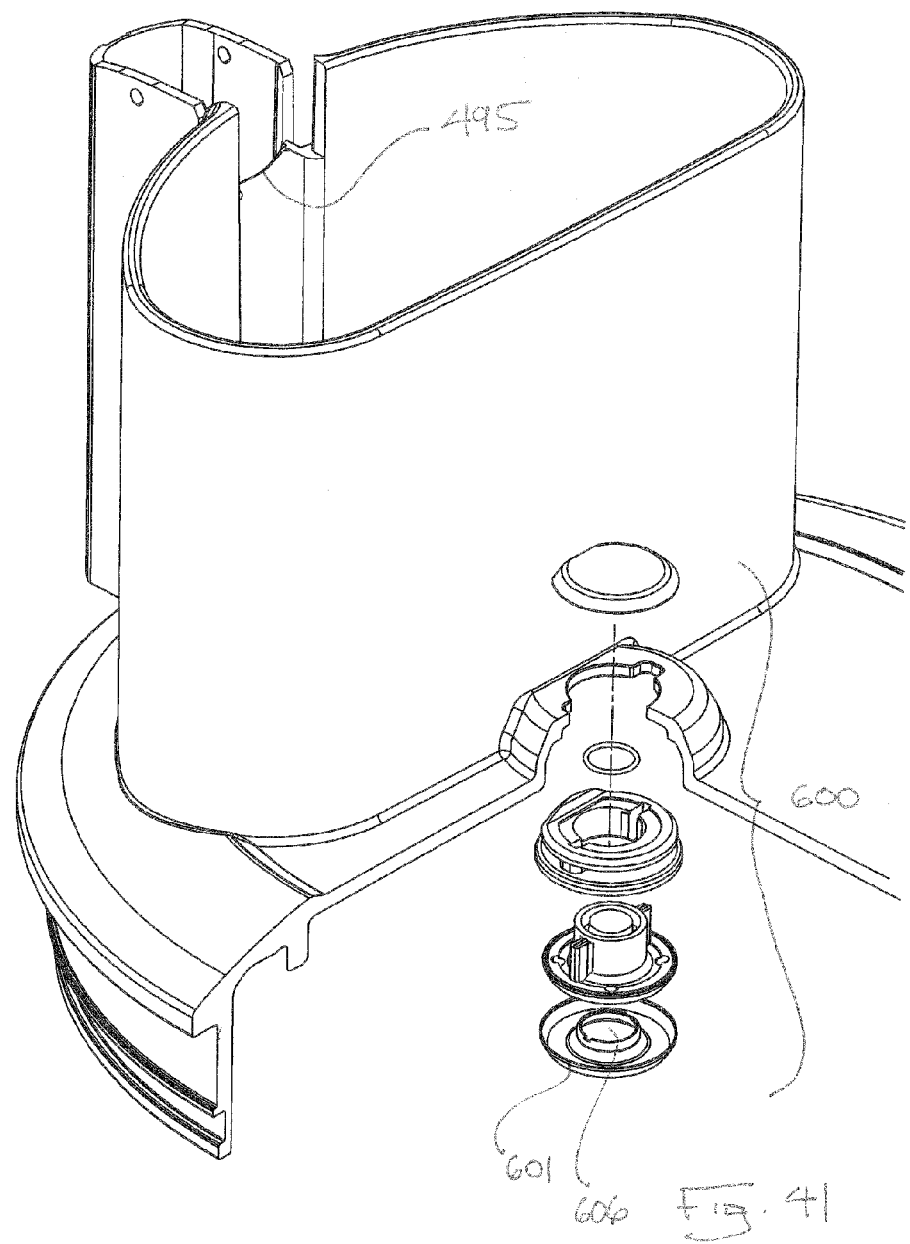
FIG. 41 is a partially sectioned and exploded view of a lid and its spindle stabiliser.
Figure 42:
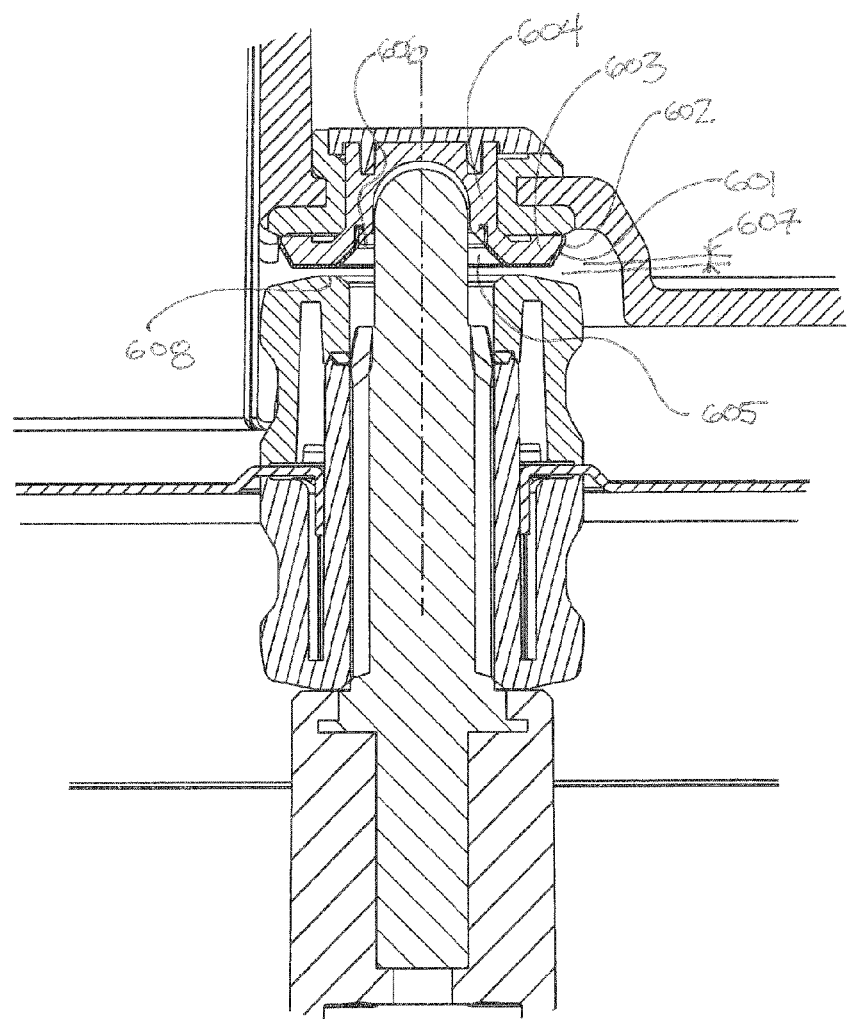
FIG. 42 is a cross section through a spindle, cutting disc and spindle stabiliser.

As shown in FIG. 41, a bushing assembly 600 is constructed similar to the bushing assembly 495 disclosed with reference to e.g. FIG. 20A and FIG. 20B. However, the previously disclosed construction is in this embodiment, modified with the addition of a stainless steel wear cap 601. As shown better in FIG. 42, the wear cap 601 comprises a circumferential trough 602 that conforms closely with and receives the lower portion 603 of the acetal journal 604. Thus, the wear cap 601 comprises a chamfered pilot opening area 605 that surrounds a central opening 606 that is adapted to receive the tip of the spindle. Because of the presence of the hard wearing stainless steel wear cap 601, the clearance 607 between the upper most part of a blade's hub 608 and the lower most part of the bushing assembly (in this case the stainless steel cap) can be reduced to 1 mm or less. Previously, clearance this small between the spinning hub of a blade and the bushing assembly would have resulted in undesirable contact between the blade hub and the bushing assembly when the blade was in motion. This contact could have been caused by inherent instability in the blade's rotation or, for example, because of downward eccentric pressure generated by food being pushed through the feed tube. Because the rotational speed of the blade is relatively high, even occasionally contact had the potential to cause overheating and wear between the upper surface 608 of the blade hub and the lower surface of the bushing assembly. The presence of the hard wearing steel cap allows extensive high speed contact between the two parts without degeneration of either. Thus, the clearance can be reduced (relative to prior art devices) to 1 mm or less. The reduced clearance has a desirable and additional stabilisation of the blade's movement, particularly when eccentric loads are imposed by downward pressure from food in the feed tube.

While the present invention has been disclosed with reference to particular details of construction, these should be understood as having been provided by way of example and not as limitations to the scope or spirit of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A food processor apparatus, the apparatus including:
a base having a motor;
a processing bowl having a handle, the processing bowl being releasably couplable to the base;
a spindle for supporting a food processor utensil;
a lid for the processing bowl, the lid having a feed tube;
a bushing assembly mounted in the lid for cooperating with a tip of the spindle;
wherein the processing bowl and lid have cooperating bayonet features that comprise a downward inclination and so cause the lid to be driven toward the bottom of the bowl during lid rotation, such that a seal extending between the lid and the bowl is urged by the rotation to forming contact between the lid and the processing bowl; and wherein the bushing assembly includes a vibration damping insert.

2. The food processor apparatus according to claim 1, wherein:

the processing bowl has female bayonet features with the downward inclination; and the lid has cooperating male bayonet features that engage with the female bayonet features of the processing bowl; and lid rotation urges the seal into contact with an angled contact section in an upper rim area of the bowl.

3. The food processor apparatus according to claim 1, the apparatus further comprising:

a spindle for retaining a food processor utensil; and a bushing assembly mounted in the lid for cooperating with a tip of the spindle.

4. The food processor apparatus according to claim 3, wherein the spindle further comprises an array of lower relief projections adapted to engage cooperating sleeves associated with a food processor utensil.

5. The food processor apparatus according to claim 4, wherein the tip of the spindle is sintered.

6. The food processor apparatus according to claim 3, the apparatus further including:

a double ended drive coupling that extends through a floor of the bowl.

7. The food processor apparatus according to claim 6, wherein the double ended drive coupling includes a lower male coupling and an upper male coupling; such that the lower male coupling component engages a female coupling component of the base; the upper male coupling component is affixed to an upper end of a drive shaft.

8. The food processor apparatus according to claim 7, wherein between the upper and lower male coupling components, a sintered bush is moulded into a polymeric bushing sleeve; the bushing sleeve being carried by a soft polymeric boot.

9. The food processor apparatus according to claim 3, the apparatus further including a food processor utensil selected from a set comprising:

an adjustable thickness cutting blade;

a whisking disc accessory; and a four bladed cutting accessory.

10. The food processor apparatus according to claim 3, the apparatus further including:

an inner bowl received by the processor bowl.

11. The food processor apparatus according to claim 10, the wherein the inner bowl has a generally cylindrical body that extends upwardly to a conical flare having an upper rim, such that the diameter of the upper rim is sufficient to contain the output opening of the feed tube.

12. The food processor apparatus according to claim 3, the apparatus further including:

a pusher device for a food processor, the pusher having a body and a safety rail that extends from the body;

wherein the safety rail cooperates with a longitudinal channel located about the feed tube in the lid of the food processor;

such that the motor can operate when the safety rail is at least partially inserted into the channel.

13. The food processor apparatus according to claim 12, wherein the safety rail has a "T" shaped cross-section.

14. The food processor apparatus according to claim 13, wherein the "T" shaped section comprises a flat capping that is supported above the body by a web that is rigidly attached to the body.

15. The food processor apparatus according to claim 13, wherein the safety rail is insert moulded with the body and formed from a harder wearing material than the body.

16. The food processor apparatus according to claim 12, wherein the safety rail has a "L" shaped cross-section; the "L" shaped section comprising a flat flange that is supported above the body by a web that is rigidly attached to the body.

17. The food processor apparatus according to claim 12, wherein: when the pusher body is being inserted into feed tube, the safety rail engages the channel located about the feed tube; the channel having an opening through which protrudes a nose of an upper link that moves in response to contact with the safety rail;

a linkage assembly extending from the upper link to a projection forming a terminal part that extends to contact a first intermediate link contained in the handle of the bowl;

such that the motor can operate when the safety rail engages with the safety linkage mechanism.

18. A food processor apparatus according to claim 12, the apparatus further including:

a user interface having a display screen; wherein, if the pusher is not present in the feed tube, the display screen depicts a visual message to a user to insert the pusher.

19. The food processor apparatus according to claim 1, wherein the vibration damping insert has a circumferential groove that receives an edge of an opening formed in the lid on a rotational centre line of the spindle.

20. The food processor apparatus according to claim 19, wherein the circumferential groove of the bushing assembly includes a pair of projections and the edge of the opening formed in the lid has a pair of opposing recesses that receive the projections, thereby preventing rotation of the vibration damping insert.

21. The food processor apparatus according to claim 20, wherein:

the spindle further comprises an array of lower relief projections adapted to engage cooperating sleeves associated with the food processor utensil;

the tip of the spindle is sintered;

the vibration damping insert of the bushing assembly is formed of a softer elastomeric material which supports an acetal polymer journal; and an acetal cap is welded to the journal by a circular weld wire, the cap being arranged to receive the tip of the sintered spindle.

22. The food processor apparatus according to claim 1, wherein the tip of the spindle is retained and stabilised by the lid mounted bushing assembly; the bushing assembly comprising the vibration damping insert and an acetal bushing.

23. A food processor apparatus according to claim 22, wherein the insert has a circumferential groove within which is located a pair of projections; the circumferential groove receives a rim of an opening formed on the upper surface of a small dome formed in the lid on a rotational centre line of the spindle or blade; the rim features a pair of opposing recesses such that the protrusions fit into the recesses for restricting rotation of the insert with respect to the lid.

24. A food processor apparatus according to claim 22, wherein the acetal bushing has a central hub having opposing ear elements; such that the hub fits into a central opening of the insert and the ear elements fit into opposing slots formed in the central opening for restricting rotation of the acetal bushing with respect to the insert.

25. A food processor apparatus according to claim 22, wherein the bushing assembly further comprises an acetal cap and a circular weld wire; such that the circular weld wire and the acetal cap are welded to the bushing.

26. A food processor apparatus according to claim 22, wherein the insert and cap are not fully symmetrical, being reduced in effective radius on one side to allow the proximal flat side of the feed tube to be located as close as possible to the centre of the rotation.

* * * * *